United States Patent
Kim

(10) Patent No.: US 9,622,327 B1
(45) Date of Patent: Apr. 11, 2017

(54) DEVICE AND METHOD FOR TESTING LED LIGHTING DEVICE

(71) Applicant: SAMSUNG ELECTRONICS CO., LTD., Suwon-si (KR)

(72) Inventor: Sun Ki Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/174,470

(22) Filed: Jun. 6, 2016

(30) Foreign Application Priority Data

Sep. 22, 2015 (KR) .................... 10-2015-0133729

(51) Int. Cl.
| | |
|---|---|
| *H05B 37/02* | (2006.01) |
| *H05B 33/08* | (2006.01) |
| *B60Q 1/14* | (2006.01) |
| *B60Q 1/30* | (2006.01) |
| *B60Q 1/06* | (2006.01) |
| *F21S 8/10* | (2006.01) |
| *F21Y 101/02* | (2006.01) |

(52) U.S. Cl.
CPC .......... *H05B 37/0227* (2013.01); *B60Q 1/06* (2013.01); *B60Q 1/1423* (2013.01); *B60Q 1/30* (2013.01); *F21S 48/115* (2013.01); *F21S 48/1323* (2013.01); *F21S 48/215* (2013.01); *F21S 48/23* (2013.01); *F21S 48/328* (2013.01); *H05B 33/0827* (2013.01); *H05B 33/0854* (2013.01); *H05B 33/0872* (2013.01); *F21Y 2101/02* (2013.01)

(58) Field of Classification Search
CPC ............ H05B 33/0827; H05B 33/0854; H05B 33/0872; H05B 37/0227; F21S 48/215; F21S 48/1323; F21S 48/23; F21S 48/328; B60Q 1/30; B60Q 1/06; B60Q 1/1423
USPC .......................................................... 315/291
See application file for complete search history.

(56) References Cited

U.S. PATENT DOCUMENTS

| | | |
|---|---|---|
| 6,372,608 B1 | 4/2002 | Shimoda et al. |
| 6,645,830 B2 | 11/2003 | Shimoda et al. |
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |

(Continued)

FOREIGN PATENT DOCUMENTS

| | | |
|---|---|---|
| JP | 2004-29370 A | 1/2004 |
| JP | 2005-106672 A | 4/2005 |

(Continued)

*Primary Examiner* — Don Le
(74) *Attorney, Agent, or Firm* — Sughrue Mion, PLLC

(57) ABSTRACT

A device for testing a lighting device including a plurality of light emitting diodes (LEDs) and an LED driver configured to drive the plurality of LEDs to emit light includes a camera configured to image a surface on which light output by the LED lighting device is incident, and generate image data corresponding to an output of the LED lighting device; and a controller configured to compare the image data with a reference condition, and in response to the output of the LED lighting device deviating from the reference condition, control the LED driver to modify brightness of at least a portion of the plurality of LEDs.

20 Claims, 20 Drawing Sheets

(56) References Cited

U.S. PATENT DOCUMENTS

| | | |
|---|---|---|
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,735,931 B2 | 5/2014 | Han et al. |
| 8,766,295 B2 | 7/2014 | Kim |
| 2002/0180955 A1* | 12/2002 | Lin .......... G06T 7/004 356/121 |
| 2009/0122030 A1* | 5/2009 | Morimoto ......... G06F 3/0321 345/179 |
| 2012/0249779 A1* | 10/2012 | Ji .......... G01N 21/8806 348/131 |
| 2014/0240375 A1 | 8/2014 | Ha |
| 2014/0267683 A1* | 9/2014 | Bibl .......... H01L 51/50 348/87 |
| 2015/0023019 A1* | 1/2015 | Chen .......... H05B 33/0803 362/276 |
| 2015/0237250 A1* | 8/2015 | Shinozaki ......... H04N 5/23203 348/211.1 |

FOREIGN PATENT DOCUMENTS

| | | |
|---|---|---|
| JP | 2006-90938 A | 4/2006 |
| JP | 2012252966 | 12/2012 |
| KR | 20-0241335 Y1 | 10/2001 |
| KR | 10-2005-0032850 A | 4/2005 |
| KR | 10-0902792 B1 | 6/2009 |
| KR | 10-1006050 B1 | 1/2011 |
| KR | 1-0076483 A | 7/2011 |
| KR | 10-2011-0138473 A | 12/2011 |
| KR | 10-2013-0072751 A | 7/2013 |
| KR | 10-1295342 B1 | 8/2013 |
| KR | 10-2014-0050288 A | 4/2014 |
| KR | 10-1439987 B1 | 9/2014 |

* cited by examiner

DEVICE AND METHOD FOR TESTING LED LIGHTING DEVICE

CROSS-REFERENCE TO RELATED APPLICATION

This application claims priority from Korean Patent Application No. 10-2015-0133729, filed on Sep. 22, 2015 with the Korean Intellectual Property Office, the disclosure of which is incorporated herein by reference in its entirety.

BACKGROUND

Methods and apparatuses consistent with example embodiment relate to a device and a method for testing a light emitting diode (LED) lighting device.

Semiconductor light emitting devices may include elements, such as an LED and the like, and have been increasingly used as a light source due to various advantages such as low power consumption, high luminance, a long lifespan and the like. In particular, semiconductor light emitting devices have received considerable attention as a possible replacement for existing halogen or xenon lamps used as light sources in motor vehicle headlamps or tail lamps.

It may be necessary to adjust a beam angle, an irradiation angle, and the like, of a semiconductor light emitting device to desired values. In particular, in the case of motor vehicle headlamps or tail lamps, an optical axis, a beam angle, an irradiation angle, and the like may be limited defined by local ordinances and the like, and design values of the semiconductor light emitting device should be determined according to the values defined in the ordinance and the like.

SUMMARY

According to an aspect of an example embodiment, there is provided a device for testing an light emitting diode (LED) lighting device including a plurality of LEDs and an LED driver configured to drive the plurality of LEDs to emit light, the device including: a camera configured to image a surface on which light output by the LED lighting device is incident, and generate image data corresponding to an output of the LED lighting device; and a controller configured to compare the image data with a reference condition, and in response to the output of the LED lighting device deviating from the reference condition, control the LED driver to modify brightness of at least a portion of the plurality of LEDs.

The controller may be further configured to virtually partition the surface into a plurality of test regions and compare the output of the LED lighting device calculated in each of the plurality of test regions with the reference condition.

The reference condition may include a plurality of reference conditions corresponding to each of the plurality of test regions.

The portion of the plurality of LEDs may correspond to at least one test region of the plurality of test regions in which the output of the LED lighting device is determined to deviate from the reference condition.

The device may further include a jig on which the LED lighting device is mounted.

The controller may be further configured to control the jig to move the LED lighting device to change an incident angle of light output by the plurality of LEDs, with respect to the surface.

The controller may be further configured to reset the reference condition based on a changed incident angle.

The reference condition may include a plurality of reference regions within the surface and the controller may be further configured to sequentially control the jig to move the LED lighting device such that a central axis of the light output by the LED lighting device corresponds to each of the plurality of reference regions.

The reference condition may include a plurality of reference conditions corresponding to the plurality of reference regions.

The reference condition may include a minimum value and a maximum value of brightness of the light output by the LED lighting device.

The controller may be further configured to increase an output current of the LED driver in response to the output of the LED lighting device being less than the minimum value, and decrease the output current of the LED driver when the output of the LED lighting device is higher than the maximum value.

The LED driver may further include a DC/DC converter circuit, and the controller may be further configured to control the DC/DC converter circuit to control a magnitude of a current supplied to the plurality of LEDs.

The LED driver may further include a variable resistance circuit connected to an output terminal of the portion of the plurality of LEDs, and the controller may be further configured to change a resistance value of the variable resistance circuit to control a magnitude of a current supplied to the portion of the plurality of LEDs.

According to an aspect of another example embodiment, there is provided a device for testing a light emitting diode (LED) lighting device, including: a jig on which the LED lighting device is mounted; a camera configured to image a surface on which light output by the LED lighting device is incident, and generate image data corresponding to an output of the LED lighting device; and a controller configured to control the jig to move the jig to control an incident angle of the light output by the LED lighting device, compare the image data with a reference condition corresponding to the incident angle, and control the LED lighting device based on the comparison.

The controller may be further configured to compare a first reference condition corresponding to a first incident angle, and a second reference condition corresponding to a second incident angle.

The controller may be further configured to virtually partition the surface into a plurality of test regions and compare the image data corresponding to each of the plurality of test regions with a different reference condition for each of the plurality of test regions.

The controller may be further configured to define a plurality of reference regions on the surface and control an incident angle of light output by the plurality of LEDs by controlling the light output by the LED lighting device corresponding to one of the plurality of reference regions.

The controller may be further configured to control the jig to tilt to control the incident angle of the light output by the LED lighting device.

The LED lighting device may include at least one among a motor vehicle headlamp and a motor vehicle tail lamp.

The controller may be further configured to compare the reference condition with the image data and determine at least one LED of the LED lighting device to be controlled based on the comparison.

According to an aspect of yet another example embodiment, there is provided a method for testing a light emitting diode (LED) lighting device including a plurality of LEDs, the method including: applying power to the LED lighting device to irradiate light output by the LED lighting device on a surface; imaging the light output by the LED lighting device on the surface and generating image data corresponding to the imaging; calculating an output of the LED lighting device corresponding to each of a plurality of test regions of the surface based on the image data; comparing the output of the LED lighting device calculated in each of the plurality of test regions with a reference condition; and controlling brightness of at least one of the plurality of LEDs, the at least one LED corresponding to a test region of the plurality of test regions in which the comparing indicates output of the LED lighting device deviates from the reference condition.

According to an aspect of still another example embodiment, there is provided a device for testing a light emitting device including a first light emitting diode (LED), a second LED and a light controller configured to drive the first LED and the second LED, the device including: a jig which supports the light emitting device and is configured to move the light emitting device to a first position corresponding to a first incident angle of light and a second position corresponding to a second incident angle of light; a camera configured to generate image data indicating brightness of a first area and a second area of a surface; and a controller configured to control the jig to move the light emitting device to the first position, compare the image data with a first reference condition, generate first comparison data, control the jig to move the light emitting device to the second position, compare the image data with a second reference condition, generate second comparison data and generate compensation data based on the first comparison data and the second comparison data.

The light controller may control the first light emitting diode and the second light emitting diode based on the compensation data.

The first reference condition may include information corresponding to the first position and the second reference condition may include information corresponding to the first position and the second position.

The compensation data may control the light emitting device to selectively control a first current supplied to the first LED and a second current supplied to the second LED.

BRIEF DESCRIPTION OF THE DRAWINGS

The above and other aspects, features, and advantages will be more clearly understood from the following detailed description taken in conjunction with the accompanying drawings, in which.

DETAILED DESCRIPTION

Figure 1:
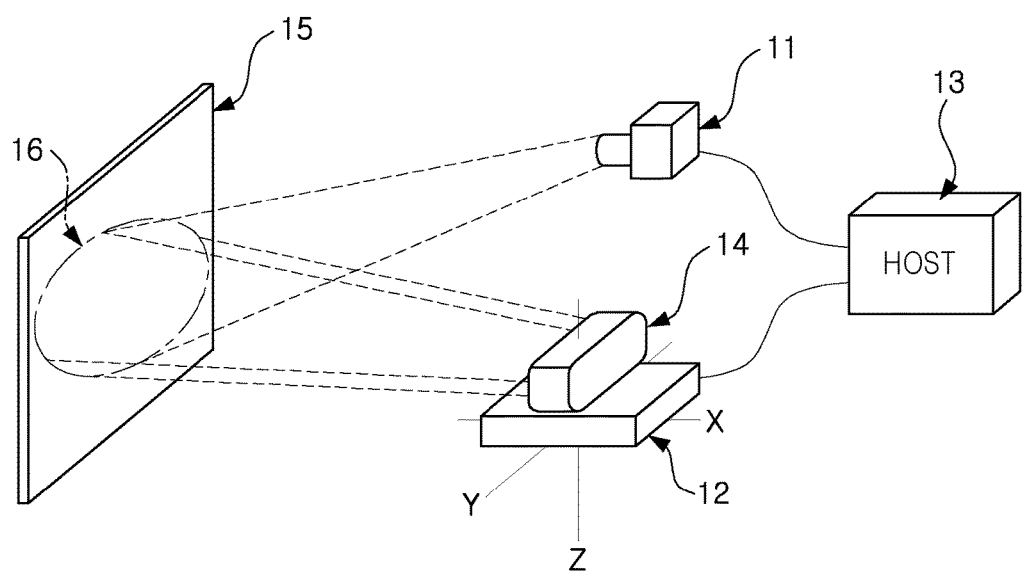
FIG. 1 is a view schematically illustrating a device for testing an LED lighting device according to an example embodiment.

Hereinafter, example embodiments will be described as follows with reference to the attached drawings.

Example embodiments may take many different forms and should not be construed as being limited to the specific example embodiments set forth herein. Rather, these example embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the example embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular example embodiments only and is not intended to be limiting of the present inventive concept. As used herein, the singular forms "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof. Expressions such as "at least one of," when preceding a list of elements, modify the entire list of elements and do not modify the individual elements of the list.

Hereinafter, example embodiments will be described with reference to schematic views illustrating example embodiments. In the drawings, for example, due to manufacturing techniques and/or tolerances, modifications of the shape shown may be estimated. Thus, example embodiments should not be construed as being limited to the particular shapes of regions shown herein, for example, to include a change in shape results in manufacturing. The following example embodiments may also be constituted by one or a combination thereof.

Example embodiments described below may have a variety of configurations and propose only a required configuration herein, but are not limited thereto.

FIG. 1 is a view schematically illustrating a device for testing an LED lighting device according to an example embodiment.

Referring to FIG. 1, a device 10 for testing an LED lighting device according to an example embodiment may include a camera module 11 (e.g., a camera), a jig module 12 on which an LED lighting device 14, an object to be tested (hereinafter, referred to as "a test object"), is mounted, a host 13, and the like. The camera module 11 may include an image sensor such, as a charge-coupled device (CCD) or the like, and may image a surface 15 on which light output by the LED lighting device 14 is irradiated. The surface 15 may be a light receiving surface. In an example embodiment, the camera module 11 may image a light receiving region 16 formed on the surface 15 by light output by the LED lighting device 14, and may generate image data.

The host 13 may analyze the image data generated by the camera module 11. The host 13 may be an electronic device including a controller for analyzing the image data and performing data processing, and, by way of example, may be a desktop computer, a laptop computer, a smartphone, a PDA, a tablet PC, or the like. The host 13 may define a plurality of test regions virtually partitioning the surface 15 and may extract information, such as brightness, color, and the like, of light incident on each of the plurality of test regions, from the image data. The host 13 may compare the extracted information with a predetermined reference condition and determine whether to control operation of the LED lighting device 14.

The LED lighting device 14 may include a plurality of LEDs used as light sources and an LED driver to drive the plurality of LEDs. When it is determined that the host 13 is required to control the operation of the LED lighting device 14, the host 13 may control an output of the LED driver. The host 13 may directly transmit a control command controlling the output of the LED driver to the LED lighting device 14, or may transmit the control command through the jig module 12.

The host 13 may control the operation of the jig module 12 mounted on the LED lighting device 14. As illustrated in FIG. 1, the jig module 12 may perform a tilt operation based on an X-axis, a Y-axis, or a Z-axis, and the tilt operation of the jig module 12 may be controlled by the host 13. That is, the host 13 may move the jig module 12 in an upward/downward/left/right direction or another direction, and may change a central axis of light output by the LED lighting device 14. As the jig module 12 is moved by the host 13, an area, a position, and the like, of the light receiving region 16 formed on the surface 15 may change.

The jig module 12 may perform the tilt operation and may include a predetermined power supply circuit for supplying driving power to the LED lighting device 14. As described above, the LED lighting device 14 may include a plurality of LEDs used as light sources, and an LED driver to drive the plurality of LEDs, and the jig module 12 may have a power supply circuit to supply input power to the LED driver.

Figure 2:
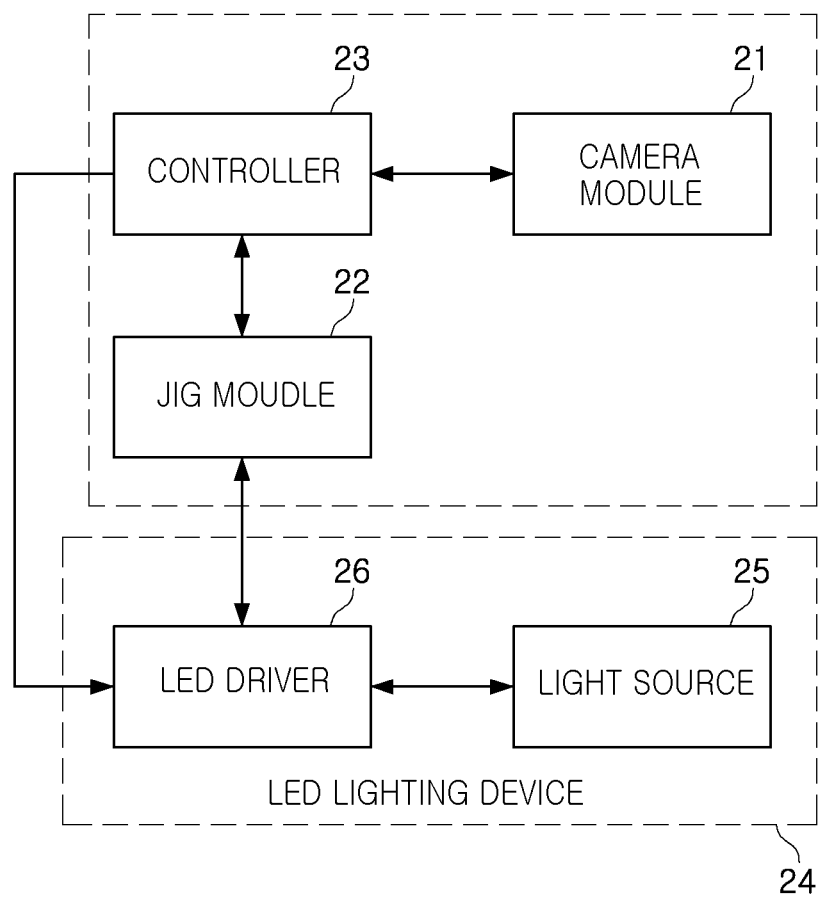
FIG. 2 is a block diagram schematically illustrating a device for testing an LED lighting device according to another example embodiment.

FIG. 2 is a block diagram schematically illustrating a device for testing an LED lighting device according to another example embodiment.

Referring to FIG. 2, a device 20 for testing an LED lighting device according to another example embodiment may include a camera module 21, a jig module 22, and a controller 23. The camera module 21 may include an image sensor, and may image a light receiving surface on which light output by an LED lighting device 24 mounted on the jig module 22 is incident. Image data generated by the image sensor of the camera module 21 may be transmitted to the controller 23.

The controller 23 may receive and analyze the image data from the camera module 21 and may control operation of the jig module 22. The jig module 22 may be tilted at a predetermined angle in an upward, downward, left or right direction, and a central axis of light output by the LED lighting device 24 may be changed according to the tilt operation of the jig module 22. Thus, the controller 23 may control the tilt operation of the jig module 22 to thereby control the output of the LED lighting device incident on the light receiving surface.

A portion of the LED lighting device 24, a test object, needs to have a luminous intensity meeting a predetermined reference condition at a specific irradiation angle to comply with various ordinances, and the like. Alternatively, the LED lighting device 24 needs to satisfy operating conditions, such as a specific level of luminous intensity, a specific irradiation angle, or the like, according to usage environments or a user demand. As an example, an irradiation angle and luminous intensity, and the like, of motor vehicle headlamps or tail lamps may be limited by legislation. In a case in which the LED lighting device 24 mounted on the jig module 22 as the test object is a motor vehicle headlamp or tail lamp, the controller 23 may tilt the jig module 22 in various directions, such as upward, downward, left, and right directions, and may then compare the luminous intensity, and the like, of the light incident onto the light receiving surface with a predetermined reference condition, thereby determining whether or not the output of the LED lighting device 24 violates the predetermined condition defined in the legislation, and the like.

When it is determined that the output of the LED lighting device 24 is extremely low or high, and thus does not meet the defined legislation, the controller 23 may control brightness, and the like, of the LED lighting device 24. As an example, the controller 23 may control operation of an LED driver 26 included in the LED lighting device 24, and may change the amount of a current applied to a light source 25 including a plurality of LEDs to thereby control the brightness of the LED lighting device 24.

The controller 23 may calculate the output of the LED lighting device 24 in the light receiving region formed on the light receiving surface. The controller 23 may virtually partition the light receiving region into a plurality of test regions, and may compare outputs of the LED lighting device 24 with reference conditions in each of the test regions, thereby determining whether or not the outputs of the LED lighting device 24 meet the reference conditions. In this case, the reference conditions compared with the outputs of the LED lighting device 24 calculated in each of the plurality of test regions may be different from each other. As an example, a luminous intensity reference condition applied in a test region positioned in a central portion of the light receiving region may have a value greater than that of a luminous intensity reference condition applied in a test region positioned in an edge of the light receiving region.

In addition, different reference conditions may be applied by the controller 23 depending on the tilt operation of the jig module 22. When the controller 23 tilts the jig module 22 in a direction such as an upward direction, a downward direction, a left direction, or a right direction, an area, luminous intensity, and the like, of the light receiving region formed on the light receiving surface may be changed. The controller 23 may determine whether or not the outputs of the LED lighting device 24 have appropriate values using different reference conditions determined depending on the tilt direction, a tilt angle, and the like, of the jig module 22.

In an example embodiment, the controller 23 may be included in the jig module 22 or the camera module 21. As in the example embodiment of FIG. 1, unlike a case in which the host 13 connected to the jig module 12 and the camera module is separately provided, the controller 23, implemented as an integrated circuit chip such as a microprocessor, may be included in the jig module 22 or the camera module 21. In a case in which the controller 23 is included in the jig module 22, the jig module 22 may have a predetermined communication module, and the controller 23 may communicate with the camera module 21 via the communication module.

Figure 3:
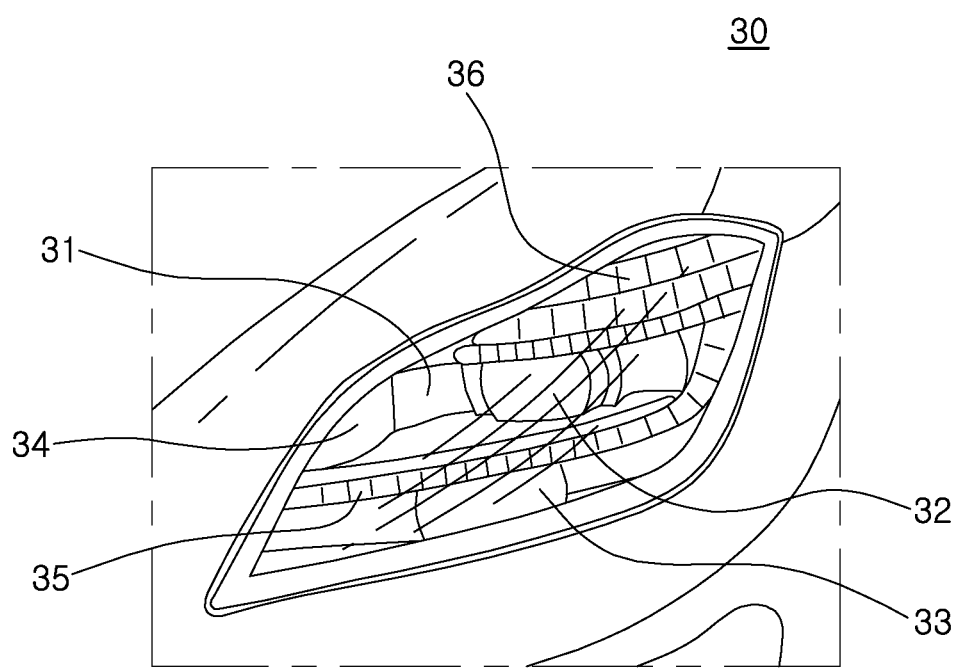
FIG. 3 is a perspective view of a motor vehicle lighting device capable of being tested by the device for testing an LED lighting device according to an example embodiment.

FIG. 3 is a perspective view of an LED lighting device capable of being tested by the device for testing an LED lighting device according to an example embodiment.

Referring to FIG. 3, an object to be tested by the device for testing an LED lighting device according to the example embodiment may be a motor vehicle lighting device. A motor vehicle headlamp may include a plurality of LEDs applied as light sources, an LED driver to drive the plurality of LEDs, and the like.

Referring to FIG. 3, a motor vehicle headlamp 30 according to the example embodiment may have a plurality of light sources emitting light for different purposes. The motor vehicle headlamp 30 may include low beams 31 and 32, a high beam 33, a cornering light 34, a daytime running light (DRL) 35, a turn signal 36, and the like. The respective light sources 31 to 36 may include LEDs having different colors or luminance levels, or may include different numbers of LEDs. Therefore, voltage and current levels required in operating the respective light sources 31 to 36 may also be different. The LED driver applied to the plurality of light sources 31 to 36 may be implemented as a single LED driver, or LED drivers may be individually provided for respective light sources 31 to 36.

When the motor vehicle headlamp 30 as illustrated in FIG. 3 is applied (as a test object) to the device 20 for testing an LED lighting device according to the example embodiment illustrated in FIG. 2, the controller 23 may sequentially turn the respective light sources 31 to 36 on or off and may compare brightness, colors, and the like, of the light sources with reference conditions. By way of example, brightness conditions required for the respective low beams 31 and 32, high beam 33, and daytime running light (DRL) 35 may be different from each other. In addition, an optical axis of the high beam 33 may be limited so as not to interrupt another vehicle's driver. The controller 23 may differently set a reference condition when only the low beams 31 and 32 are turned-on and a reference condition when the low beams 31 and 32, together with the high beam 33, are turned-on, and may determine whether or not operation of the motor vehicle headlamp 30 meets criteria defined in the legislation, and the like.

Figure 4A:
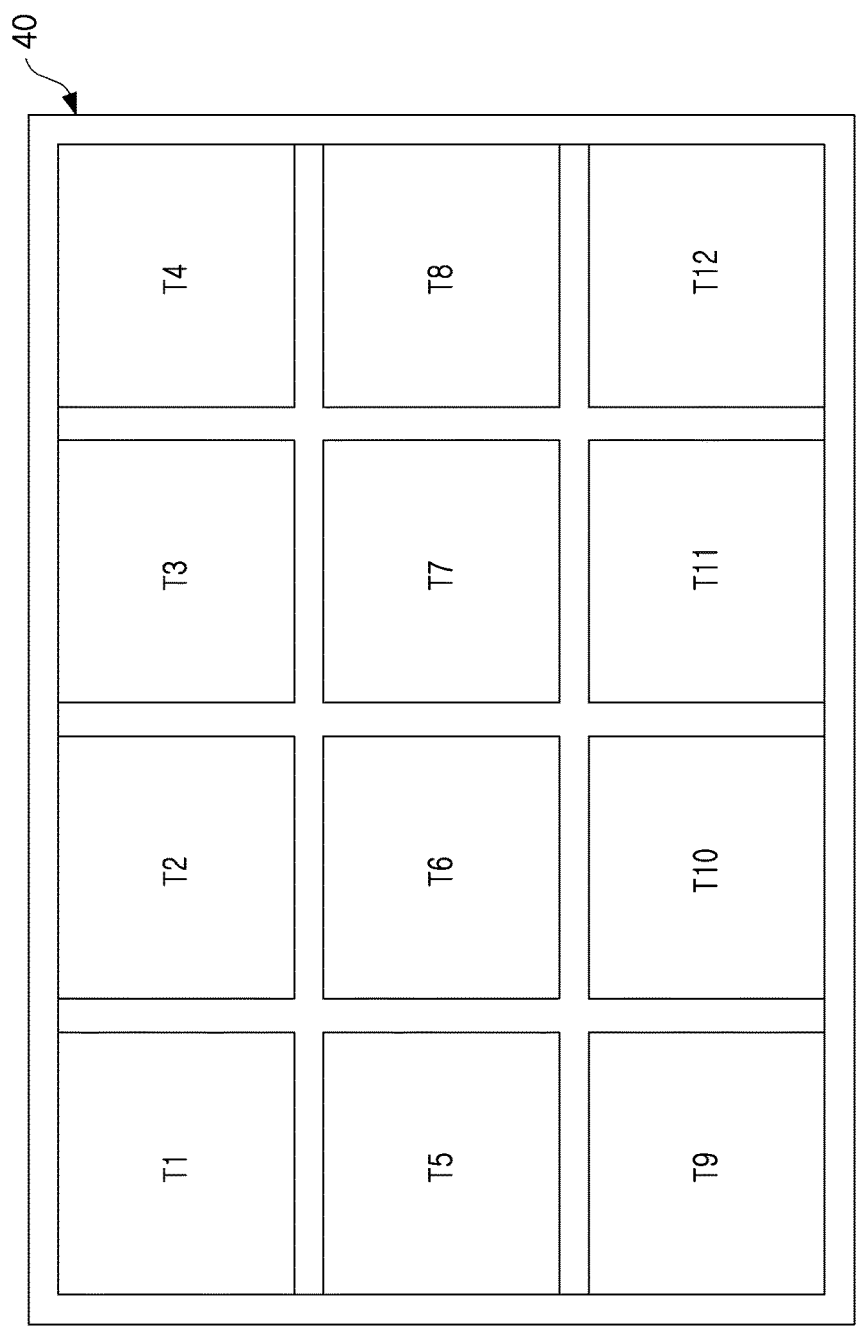
FIG. 4A and FIG. 4B are views illustrating operation of the device for testing an LED lighting device according to various example embodiments.
Figure 4B:
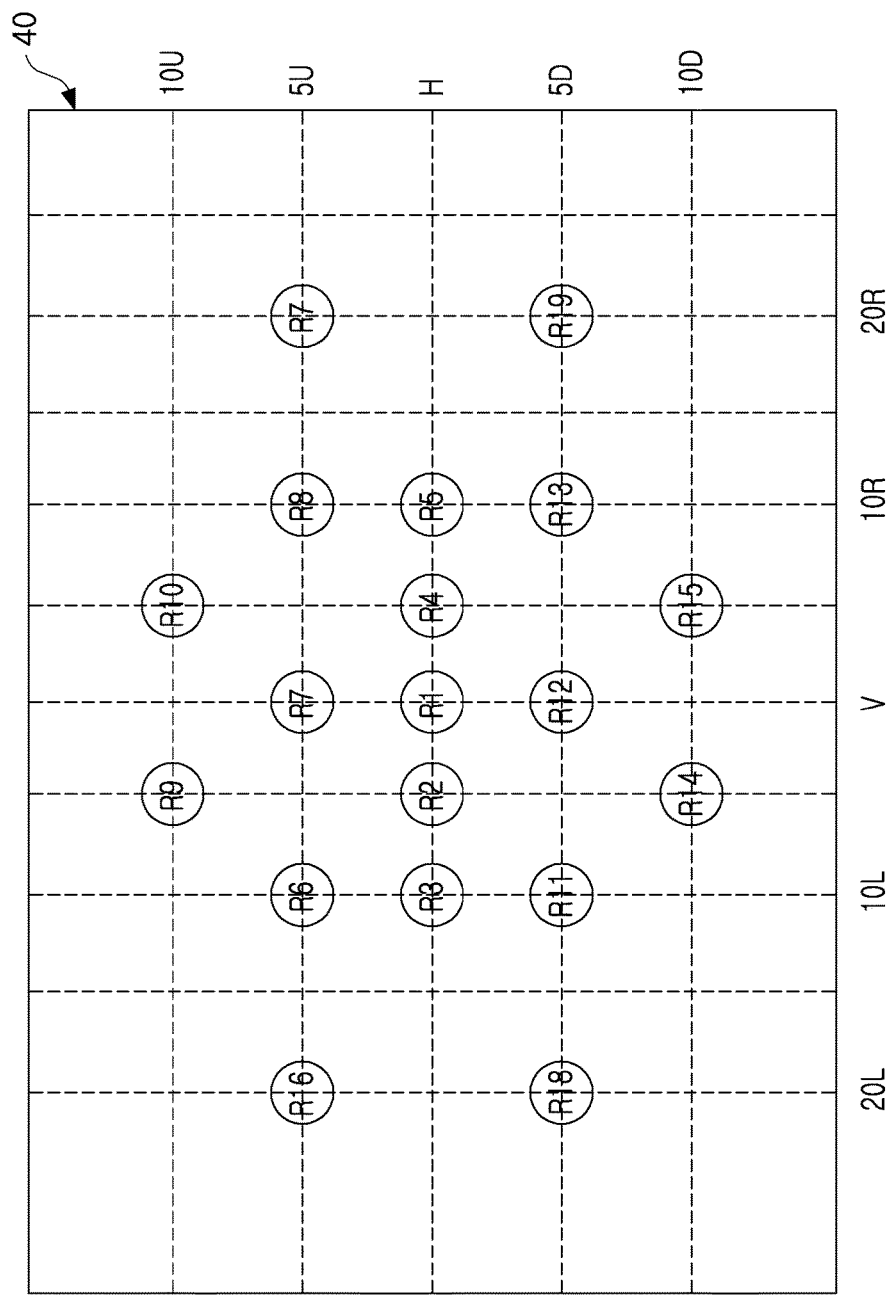

FIG. 4A and FIG. 4B are views, each illustrating operation of the device for testing an LED lighting device according to an example embodiment. Hereinafter, an operation of the device for testing an LED lighting device according to the example embodiment will be described with reference to FIG. 2.

FIG. 4A and FIG. 4B illustrate an imagable region (imaging-enabling region) in which the camera module 21 may perform imaging from the light receiving surface. First, referring to FIG. 4A, an imagable region (imaging-enabling region) 40 may be on the light receiving surface, and a plurality of test regions T1 to T12 may be set within the imagable region 40. The controller 23 may analyze image data generated through imaging the imagable region 40 by the camera module 21 and may virtually partition the imagable region 40 into the plurality of test regions T1 to T12. That is, the plurality of test regions T1 to T12 may be virtual partition regions defined by the controller 23 based on the image data, rather than regions actually partitioned on the light receiving surface. The number of the test regions T1 to T12 may be appropriately modified according to various example embodiments, and the controller 23 may apply different reference conditions to each of the test regions T1 to T12.

In addition, the controller 23 may apply different reference conditions according to an incident angle of light output by the LED lighting device 24. The controller 23 may move the jig module 22 to change the incident angle of light output by the LED lighting device 24. Referring to FIG. 4B, the controller 23 may define a predetermined coordinate plane within the imagable region 40 and may determine reference lines H and V within the coordinate plane. A plurality of reference lines may be defined in a vertical direction and a lateral direction of the horizontal reference line H and the vertical reference line V, and reference regions R1 to R19 may be defined in at least some intersecting points of reference lines. The number and disposition of the reference regions R1 to R19 may be appropriately modified.

The controller 23 may allow the central axis of light output by the LED lighting device 24 to correspond to one of the plurality of reference regions R1 to R19 and may change the incident angle of light output by the LED lighting device 24. For example, when the central axis of light output by the LED lighting device 24 corresponds to a first reference region R1, the central axis of light output by the LED lighting device 24 may be perpendicular with respect to the light receiving surface. When the central axis of light output by the LED lighting device 24 corresponds to other reference other than the first reference region R1 (regions R2 to R19), the light receiving region formed on the light receiving surface by light output from the LED lighting device 24 may deviate from the imagable region 40.

That is, a position and a size of the light receiving region formed on the light receiving surface by light output from the LED lighting device 24, and the output and the like of the LED lighting device 24 calculated in the plurality of test regions T1 to T12 may be differently determined by the movement of the jig module 22 controlled by the controller 23. Therefore, the controller 23 may determine different reference conditions according to each of the reference regions R1 to R19 corresponding to the central axis of light output by the LED lighting device. In addition, the reference conditions determined according to each of the reference regions R1 to R19 may be a group of data including the plurality of reference conditions applied to each of the plurality of test regions T1 to T12.

FIG. 5 through FIG. 8 are views, each illustrating operation of the device for testing an LED lighting device according to various example embodiments.

Figure 5:
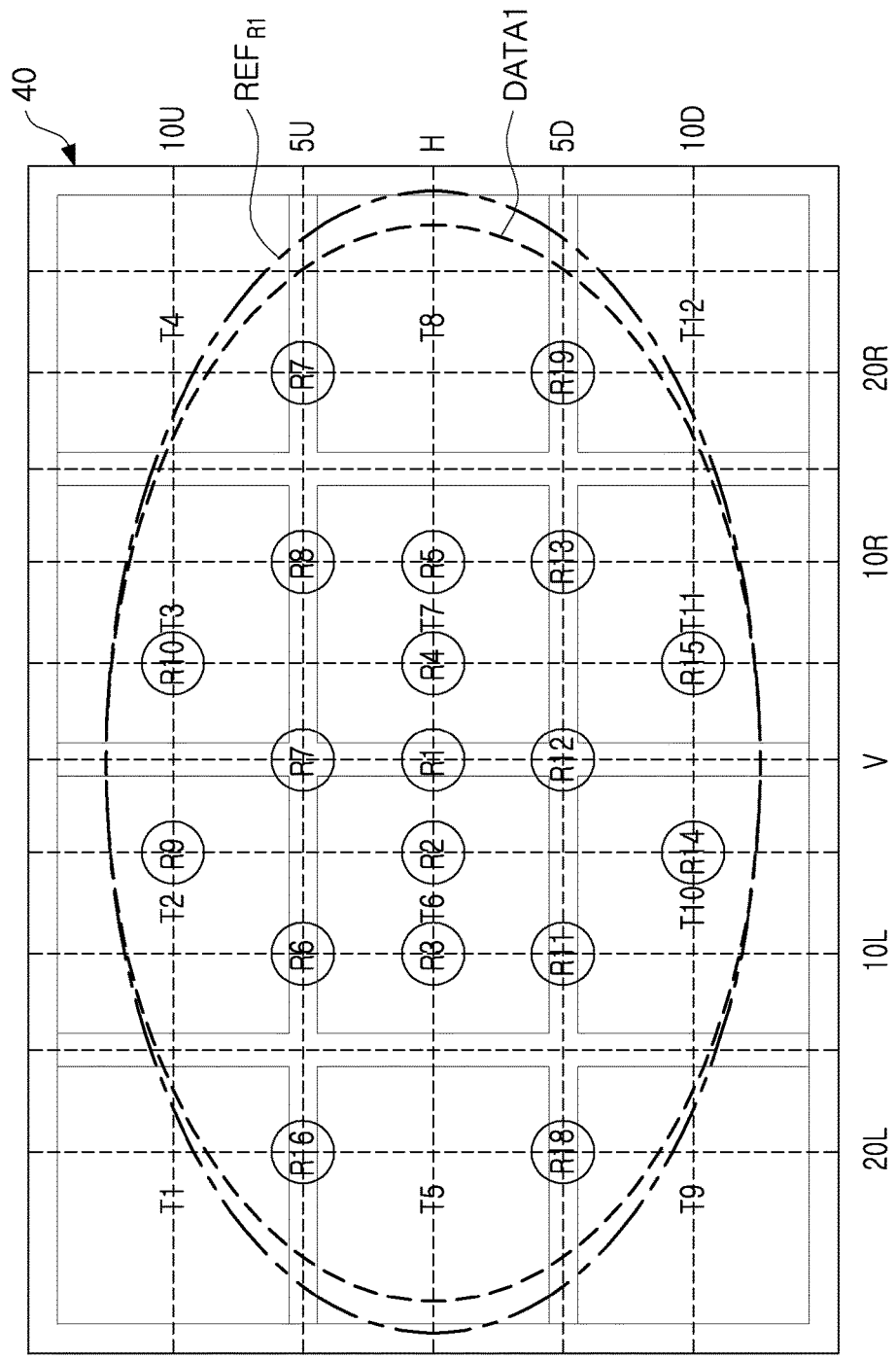
FIG. 5 through FIG. 8 are views illustrating operation of the device for testing an LED lighting device according to various example embodiments.

In the example embodiment of FIG. 5, the central axis of light output by the LED lighting device 24 may correspond to the first reference region R1. That is, the central axis of light output by the LED lighting device 24 may be located in the first reference region R1. A first reference light distribution region $REF_{R1}$ may be a light receiving region expected to be shown on the light receiving surface when the central axis of light output by the LED lighting device 24 corresponds to the first reference region R1.

The controller 23 may set a reference condition for each of the plurality of test regions T1 to T12. The reference condition may be a reference condition regarding brightness, colors, and the like, of light incident on each of the plurality of test regions T1 to T12, and may be within a range formed by giving a margin to a predetermined reference value. In addition, the reference condition may be a value set by criteria defined in the legislation and the like. When the LED lighting device 24 is a motor vehicle headlamp, the reference condition may be correspond to a brightness, an irradiation angle, and the like, that need to be fulfilled when each of the light sources (a low beam, a high beam, a daytime running light, and a turn signal) for various uses is turned-on.

In the example embodiment of FIG. 5, the first to twelfth test regions T1 to T12 may have different reference conditions. The controller 23 may compare the reference conditions for the case in which the central axis of light output by the LED lighting device 24 corresponds to the first reference region R1, with outputs of the LED lighting device calculated in each of the test regions T1 to T12. As a result of the comparison, when it is determined that the outputs of the LED lighting device 24 calculated in each of the test regions T1 to T12 deviate from the reference conditions for the respective test regions T1 to T12, the controller 23 may change the outputs of the LED lighting device 24.

In an example embodiment, the reference conditions defined in each of the test regions T1 to T12 by the first reference light distribution region $REF_{R1}$, and the outputs of the LED lighting device 24 calculated by the controller 23 from image data DATA1 generated by the camera module 21 imaging the light receiving surface, may be defined as in the following Table 1. Table 1 may indicate brightness of light output by the LED lighting device 24. Because light emitted by the LED lighting device 24 is incident onto the light receiving surface, the brightness of light may be calculated in candela (CD) or lumen (LM). The controller 23 may compare the reference conditions differently determined for the respective test regions T1 to T12 with the outputs of the LED lighting device 24 calculated in the respective test regions T1 to T12. The controller 23 may then determine, for each of the respective test regions T1 to T12, whether outputs of the LED lighting device 24 are defective, by determining whether each of the outputs are lower than minimum values of the reference conditions or greater than maximum values of the reference conditions. In the example embodiment illustrated in Table 1, the outputs of the LED lighting device 24 calculated in first, fourth, fifth, eighth, ninth, and twelfth test regions T1, T4, T5, T8, T9, and T12 may be determined to be defective.

TABLE 1

| Test Region | Minimum Value | Maximum Value | Outputs of LED Lighting Device | Determination Result |
|---|---|---|---|---|
| T1 | 8850 | 8880 | 8837 | X |
| T2 | 8920 | 8950 | 8925 | O |
| T3 | 8920 | 8950 | 8923 | O |
| T4 | 8850 | 8880 | 8835 | X |
| T5 | 9100 | 9150 | 9080 | X |
| T6 | 9200 | 9250 | 9206 | O |
| T7 | 9200 | 9250 | 9210 | O |
| T8 | 9100 | 9150 | 9075 | X |
| T9 | 8850 | 888 | 8836 | X |
| T10 | 8920 | 8950 | 8921 | O |
| T11 | 8920 | 8950 | 8922 | O |
| T12 | 8850 | 8880 | 8830 | X |

The controller 23 may change a magnitude of a current or voltage supplied to LEDs corresponding to the first, fourth, fifth, eighth, ninth, and twelfth test regions T1, T4, T5, T8, T9, and T12 in which the outputs of the LED lighting device 24 are determined to be defective. In the example embodiment illustrated in the Table 1, the controller 23 may increase the magnitude of a current or voltage supplied to LEDs corresponding to the first, fourth, fifth, eighth, ninth, and twelfth test regions T1, T4, T5, T8, T9, and T12. The controller 23 may increase a magnitude of a driving current output by the LED driver 26 included in the LED lighting device 24 to control operation of the LED lighting device 24 in such a manner that the outputs of the LED lighting device 24 detected in the first, fourth, fifth, eighth, ninth, and twelfth test regions T1, T4, T5, T8, T9, and T12 satisfy the reference conditions.

Figure 6:
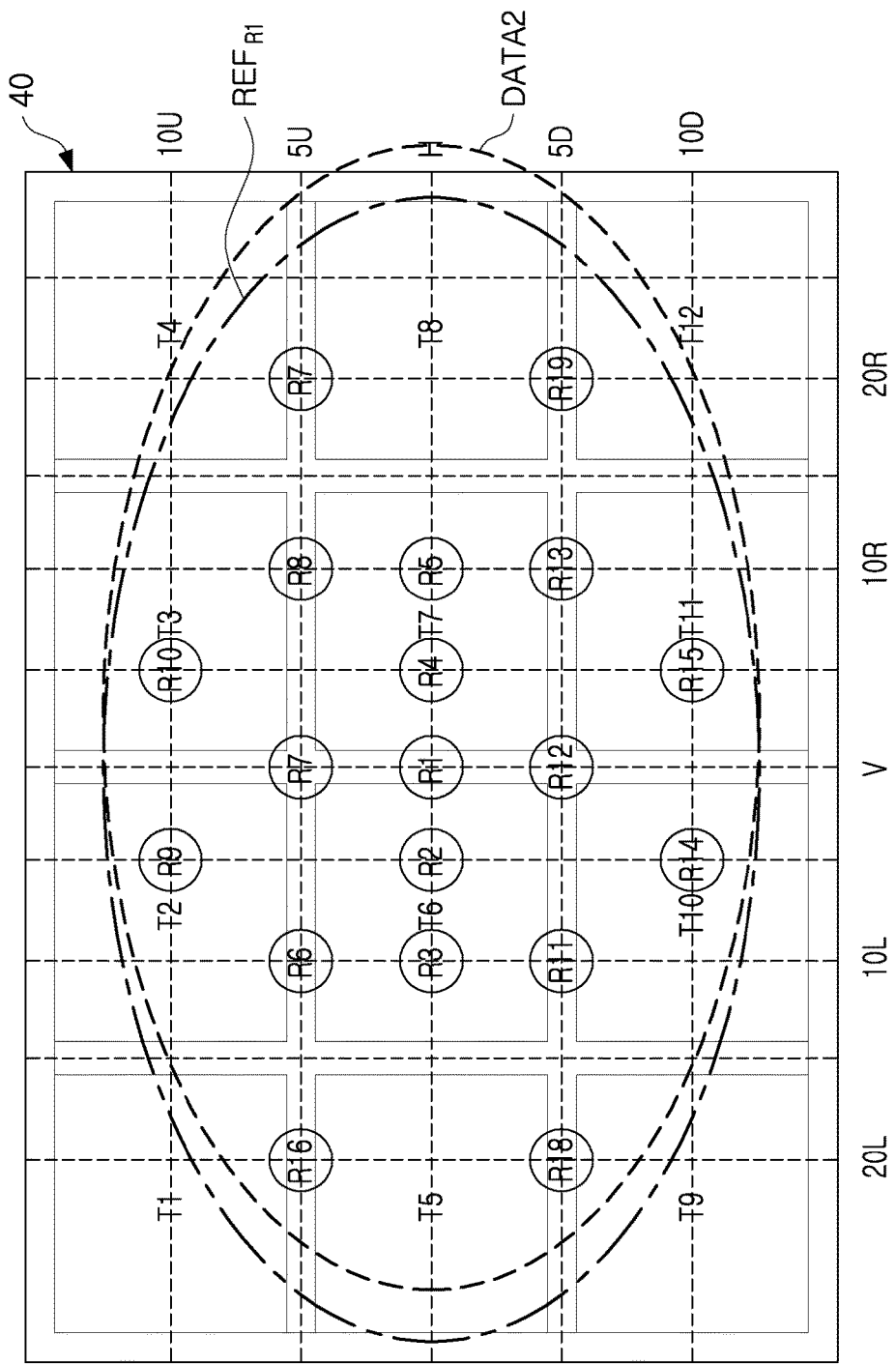

Next, referring to FIG. 6, the central axis of light output by the LED lighting device 24 may correspond to the first reference region R1, similar to the example embodiment illustrated in FIG. 5. Thus, a reference light distribution region for determining the operation of the LED lighting device 24 may be the first reference light distribution region $REF_{R1}$.

In the example embodiment illustrated in FIG. 6, image data DATA2 generated by the camera module 21 imaging the light receiving surface may not coincide with the first reference light distribution region $REF_{R1}$. That is, in the first, fifth, and ninth reference regions T1, T5, and T9, the outputs of the LED lighting device 24 may be detected as lower than the minimum values of the reference conditions, and in the fourth, eighth, and twelfth reference regions T4, T8, and T12, the outputs of the LED lighting device 24 may be detected as higher than the maximum values of the reference conditions.

The controller 23 may determine, within the light source 25, LEDs influencing the outputs of the LED lighting device 24 detected in the first, fifth and ninth reference regions T1, T5, and T9, and increase a current supplied to the corresponding LEDs. The controller 23 may reduce a current supplied to LEDs corresponding to the fourth, eighth, and twelfth reference regions T4, T8, and T12. That is, to control the output of the LED lighting device, the output of the LED lighting device 24 may be increased or decreased by simply controlling the operation setting of the LED driver 26 without an alternation in hardware design of the LED lighting device 24. Therefore, cost and time required to alter the hardware design of the LED lighting device 24 may be reduced.

When the LED lighting device 24 is mounted on the jig module 22, the controller 23 may move the jig module 22 in such a manner that the central axis of light output by the LED lighting device 24 corresponds to each of the plurality of reference regions R1 to R19. The controller 23 may control the jig module 22 in such a manner that the central axis of light output by the LED lighting device 24 corresponds to the first reference region R1. When a test on the output of the LED lighting device 24 for the first reference region R1 is completed, the controller 23 may sequentially move the jig module 22 to perform a test on the output of the LED lighting device 24 for each of the remaining reference regions R2 to R19. Thus, the output of the LED lighting device 24 may be tested at various incident angles, whereby the LED lighting device 24 may be controlled to have an output meeting criteria defined in the ordinance, and the like.

Figure 7:
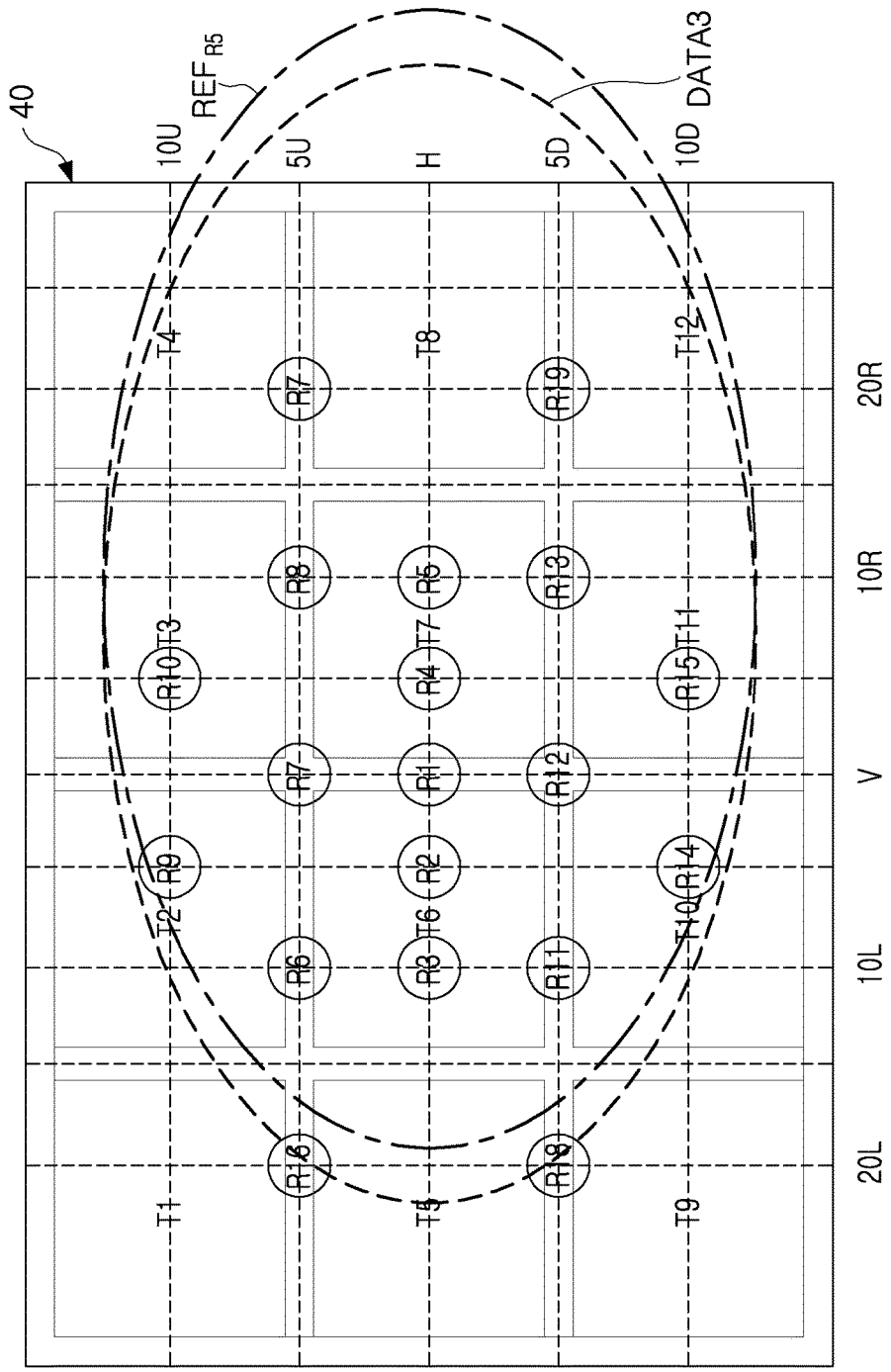

Referring to FIG. 7, the controller 23 may move the jig module 22 in such a manner that the central axis of light output by the LED lighting device 24 corresponds to the fifth reference condition R5. The controller 23 may tilt the jig module 22 rightward by 10R, whereby the central axis of light output by the LED lighting device 24 may correspond to the fifth reference region R5.

A fifth reference light distribution region $REF_{R5}$ applied in the example embodiment illustrated in FIG. 7 may be different from the first reference light distribution region $REF_{R1}$. That is, when a test on the LED lighting device 24 is performed after the central axis of light output by the LED lighting device 24 corresponds to each of the reference regions R1 to R19, the controller 23 may apply different reference light distribution regions to the respective reference regions R1 to R19. Therefore, reference conditions defined in the test regions T1 to T12 may be varied depending on which of the reference regions R1 to R19 the central axis of light output by the LED lighting device 24 of directed to.

The controller 23 may compare reference conditions in the respective test regions T1 to T12 defined by the fifth reference light distribution region $REF_{R5}$ with outputs of the LED lighting device 24 calculated from image data DATA3 in each of the test regions T1 to T12. As described above, the reference condition defined in each of the test regions T1 to T12 may have a predetermined range defined by a minimum value and a maximum value.

Referring to FIG. 7, in the first test region T1, the output of the LED lighting device 24 is detected to be higher than the maximum value of the reference condition. Also, in the second, fifth, ninth, and tenth test regions T2, T5, T9, and T10, the outputs of the LED lighting device 24 may exceed maximum values of the reference conditions. The controller 23 may detect the test regions T1 to T12 in which the outputs of the LED lighting device 24 are detected to be higher than the maximum values of the reference conditions, and may control the operation of the LED driver 26 to reduce the outputs of LEDs corresponding to the detected test regions T1 to T12.

In the fourth and twelfth test regions T4 and T12, the output of the LED lighting device 24 may be detected to be lower than the minimum value of the reference condition. Therefore, the controller 23 may control the operation of the LED driver 26 to increase the outputs of LEDs corresponding to the fourth and twelfth test regions T4 and T12.

Figure 8:
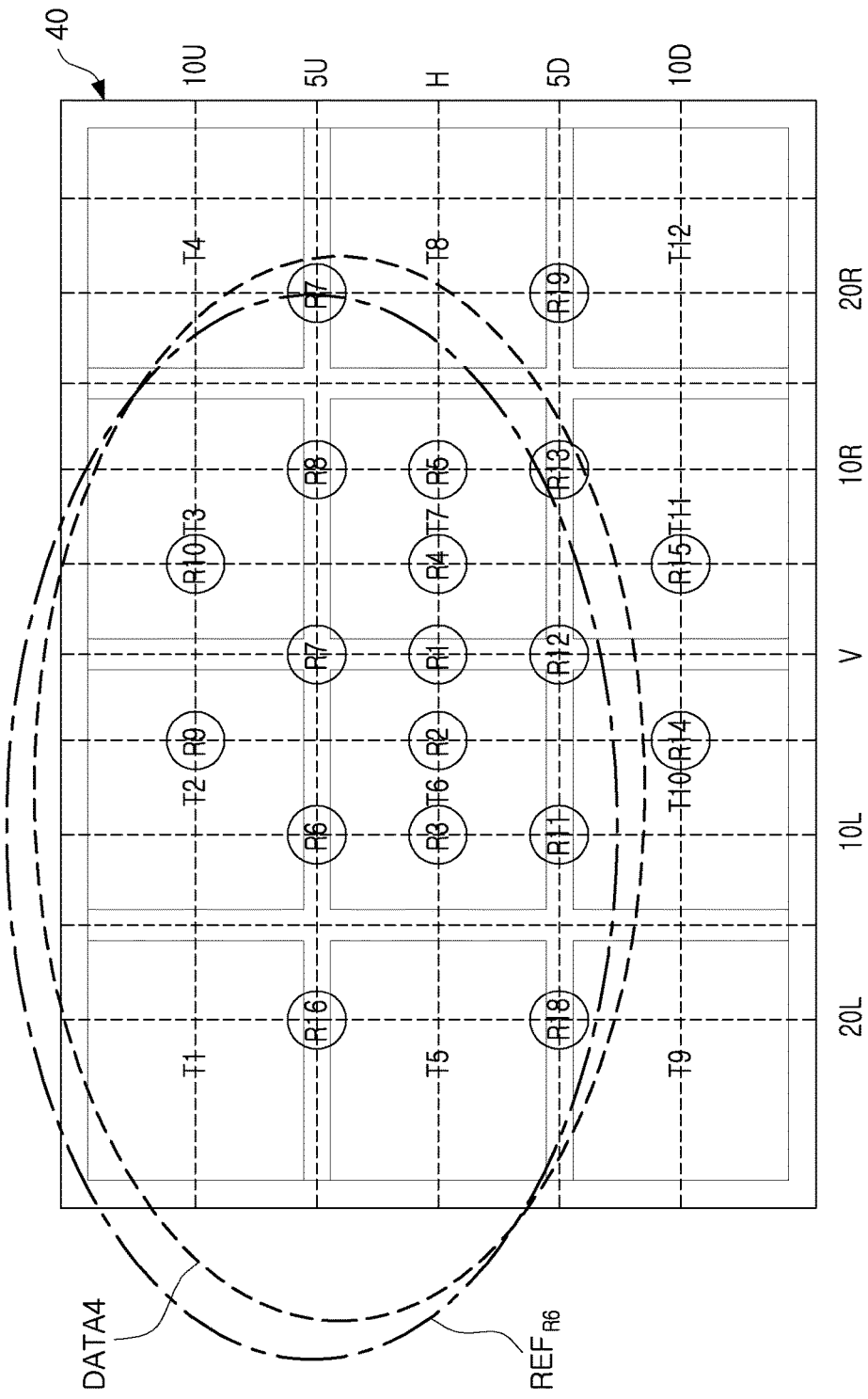

FIG. 8 is a view illustrating a reference light distribution region $REF_{R6}$ and image data DATA4 in a case in which the central axis of light output by the LED lighting device 24 corresponds to a sixth reference region R6. The controller 23 may tilt the jig module 22 in left and upward directions to allow the central axis of light output by the LED lighting device 24 to correspond to the sixth reference region R6. Image data DATA4 may be data generated through imaging the light receiving surface by the camera module 21, and the controller 23 may calculate outputs of the LED lighting device 24 in the respective test regions T1 to T12 based on the image data DATA4.

In the first test region T1, the output of the LED lighting device 24 may be lower than the minimum value of the reference condition defined by the reference light distribution region $REF_{R6}$. In addition, in the fourth and eighth to eleventh test regions T4 and T8 to T11, the outputs of the LED lighting device 24 may be higher than the maximum values of the reference conditions defined by the reference light distribution region $REF_{R6}$.

The controller 23 may control the operation of the LED driver 26 based on a result of comparing the outputs of the LED lighting device 24 determined in each of the test regions T1 to T12 with the reference conditions thereof. The controller 23 may control the operation of the LED driver 26 in such a manner that an output of an LED corresponding to the first test region T1, that is, emitting light to the first test region T1 may be increased, while outputs of LEDs emitting light to the fourth and eighth to eleventh test regions T4 and T8 to T11 may be decreased.

As described above, the controller 23 may set different reference light distribution regions based on reference regions R1 to R19 corresponding to the central axis of light output by the LED lighting device 24. Consequently, reference conditions applied to each of the test regions T1 to T12 may be varied according to the reference regions R1 to R19 corresponding to the central axis of light output by the LED lighting device 24. The controller 23 may compare the reference conditions with the outputs of the LED lighting device 24 in each of the test regions T1 to T12 and may control the operation of the LED driver 26. Therefore, to independently control the outputs of the LED lighting device incident on each of the test regions T1 to T12, the LED driver 26 may include a driving circuit capable of independently controlling a current supplied to a portion of the plurality of LEDs. Hereinafter, a description will be made with reference to FIG. 9 and FIG. 10.

Figure 9:
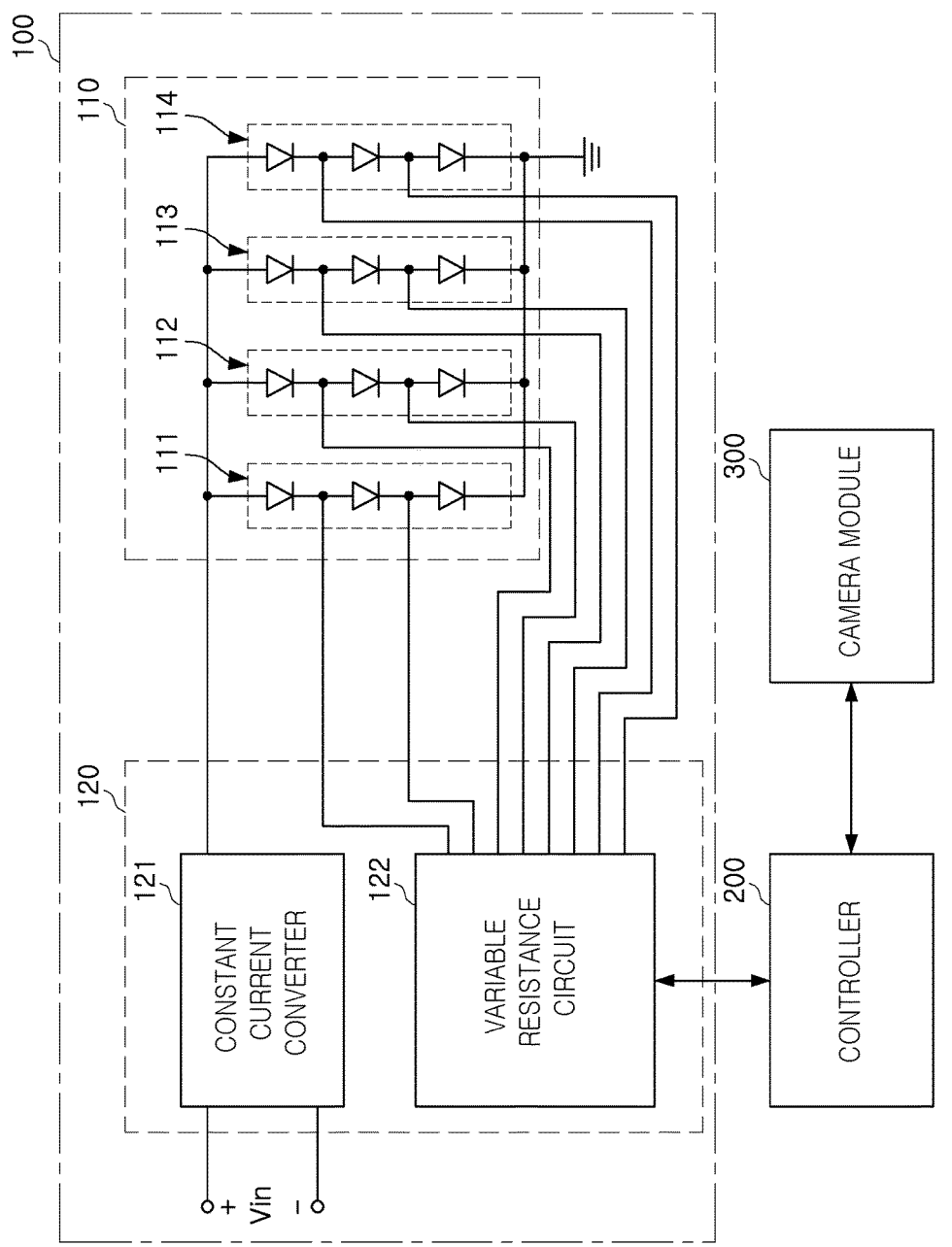
FIG. 9 and FIG. 10 are circuit diagrams schematically illustrating a circuit configuration of an LED lighting device capable of being tested by the device for testing an LED lighting device according to various example embodiments.
Figure 10:
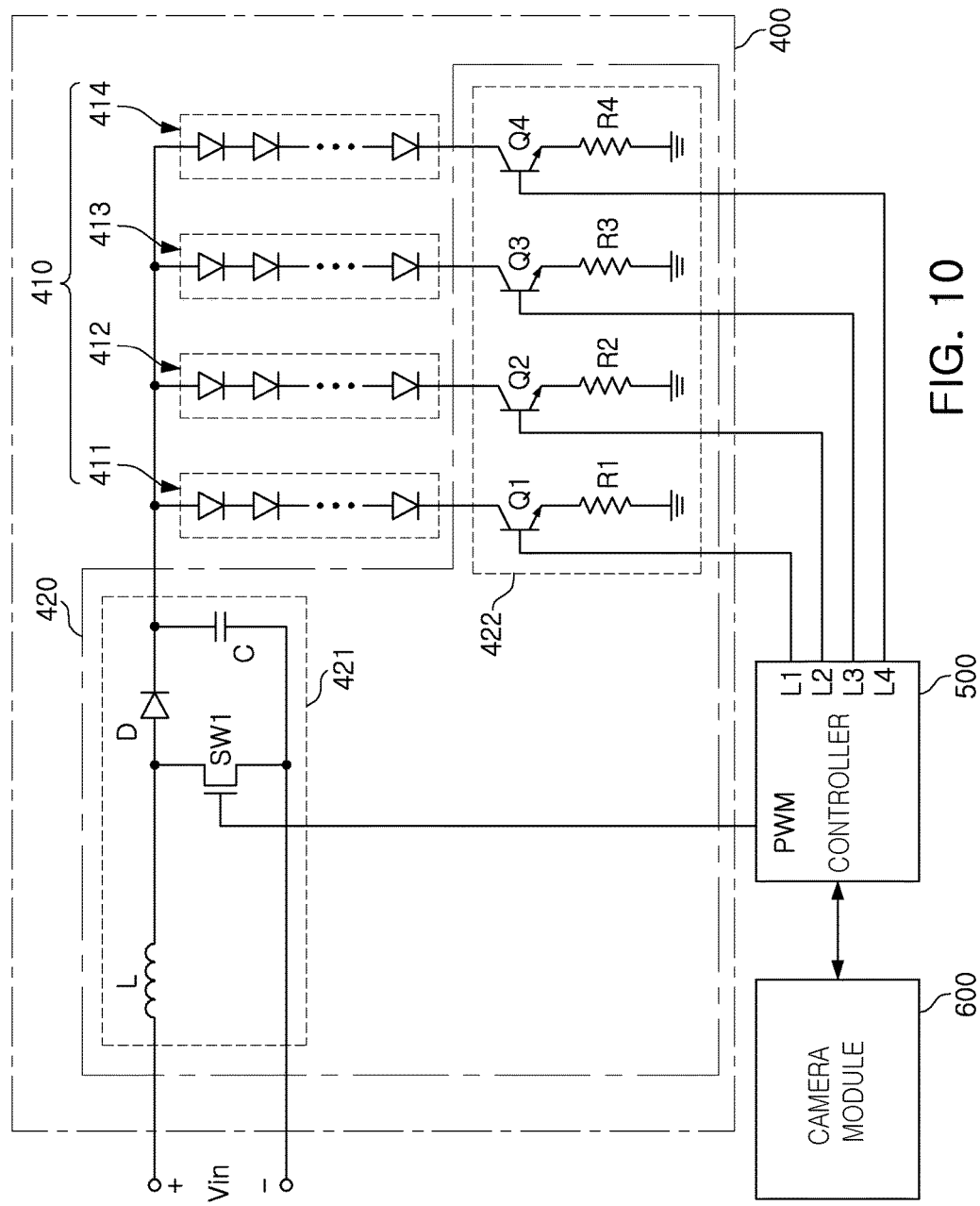

FIG. 9 and FIG. 10 are circuit diagrams, each schematically illustrating a circuit configuration of an LED lighting device capable of being tested by the device for testing an LED lighting device according to an example embodiment.

First, referring to FIG. 9, an LED lighting device 100 according to the example embodiment may include a light source 110 having a plurality of LEDs and an LED driver 120 driving the light source 110. The LED driver 120 may include a constant current converter 121 and a variable resistance circuit 122, and operation of the variable resistance circuit 122 may be controlled by a controller 200.

The controller 200, an integrated circuit such as a microprocessor, a processing device, or the like, may be mounted in a computer device, and may be communicably connected to the LED driver 120. The controller 200 may communicate with a camera module 300 and may calculate an output of the LED lighting device 100 from image data generated by the camera module 300 and compare the output of the LED lighting device 100 with a predetermined reference condition. When it is determined that the output of the LED lighting device 100 deviates from the reference condition, the controller 200 may change an operation setting of the LED driver 120. Therefore, brightness of at least a portion of the plurality of LEDs may be increased or decreased.

The light source 110 may include a plurality of LED arrays 111 to 114. Each of the plurality of LED arrays 111 to 114 may include at least one LED. When the LED lighting device 100 is a motor vehicle headlamp, the individual LED arrays 111 to 114 may correspond to a low beam, a high beam, a daytime running light (DRL), and a turn signal, respectively. In this case, the respective LED arrays 111 to 114 need to independently operate, and the constant current converter 121 may differently control a current supplied to each of the LED arrays 111 to 114.

The variable resistance circuit 122 may include a plurality of terminals connected to nodes between the LEDs included in each of the plurality of LED arrays 111 to 114, and may include a digital potentiometer. The controller 200 may control brightness of the plurality of LED arrays 111 to 114 by increasing or decreasing a resistance value of the digital potentiometer. As an example, when a resistance value of the digital potentiometer connected to the first LED array 111 increases, a current flowing in the first LED array 111 may be increased, and thus, an output of the first LED array 111 may be increased.

As described with reference to FIG. 5 through FIG. 8, the controller 200 may compare outputs of the LED lighting device 100 calculated in each of the test regions T1 to T12 with reference conditions according to a reference light distribution region, and may control the operation of the variable resistance circuit 122 according to the comparison result. For example, in the case of determining whether or not the LED lighting device 100 satisfies criteria, such as those defined in an ordinance and the like, by turning only the first LED array 111 corresponding to the low beam on, when the outputs of the LED lighting device 100 deviate from the reference conditions in one or more of the test regions T1 to T12, the controller 200 may change an operation setting of LEDs corresponding to the corresponding test regions. When the output of the LED lighting device 100 detected in the first test region T1 is lower than a minimum value of the reference condition, the controller 200 may control the resistance value of the variable resistance circuit 122 to increase a current flowing in the LED emitting light to the first test region T1.

Next, referring to FIG. 10, an LED lighting device 400 may include a light source 410 having a plurality of LED arrays 411 to 414, and an LED driver 420. In an example embodiment illustrated in FIG. 10, the LED driver 420 may include a DC-DC converter 421 and a linear control circuit 422. The DC-DC converter 421 may control a voltage transferred to the light source 410 using an input voltage Vin, and the linear control circuit 422 may individually control a current flowing in each of the LED arrays 411 to 414. Operations of the DC-DC converter 421 and the linear control circuit 422 may be controlled by a controller 500.

In an example embodiment, the LED driver 400 may include a switch controller. The switch controller may control SW1, Q1, Q2, Q3 and Q4. The controller 500 may be connected with the switch controller of the LED driver 400, and change an operation setting saved in the switch controller. When the output of the LED lighting device 400 deviates from the reference condition, the controller 500 may change the operation setting saved in the switch controller.

As described with reference to FIG. 5 through FIG. 8, the controller 500 may compare the output of the LED lighting device 400 with a predetermined reference condition, and when the output of the LED lighting device 400 deviates from the reference condition, may control the operation of the LED driver 420. A camera module 600 may image light irradiated on the light receiving surface by the LED lighting device 400 and may generate image data. The controller 500 may analyze the image data and may calculate the output of the LED lighting device 400.

When the output of the LED lighting device 400 is higher than a maximum value of the reference condition or is less than a minimum value of the reference condition, the controller 500 may control the operation of the DC-DC converter 421 or the linear control circuit 422 to increase or decrease the output of the LED lighting device 400. Hereinafter, a description will be made with reference to FIG. 5 and FIG. 6.

First, referring to FIG. 5, the central axis of light output by the LED lighting device may correspond to the first reference region R1, and reference conditions in the respective test regions T1 to T12 may be determined by the first reference light distribution region $REF_{R1}$. The camera module 600 may image the light receiving surface to generate image data DATA1, and the controller 500 may calculate the outputs of the LED lighting device 400 based on the image data DATA1. The outputs of the LED lighting device 400 calculated by the controller 500 may include brightness or colors of the LED lighting device 400 calculated in the respective test regions T1 to T12, or brightness, colors, and the like of the LED lighting device 400 calculated in the entirety of the light receiving surface.

In the example embodiment illustrated in FIG. 5, the outputs of the LED lighting device 400 may be irradiated in a relatively small area as compared to the first reference light distribution region $REF_{R1}$. Thus, the controller 500 may increase power supplied to the light source 410 itself by increasing the output of the DC-DC converter 421 to thereby broaden the area in which the outputs of the LED lighting device 400 are irradiated. The controller 500 may increase a duty ratio of a PWM signal applied to a control terminal of a switch element SW1 included in the DC-DC converter 421, and thus, may increase the outputs of the LED lighting device 400.

In the example embodiment of FIG. 6, it is shown that the outputs of the LED lighting device 400 may be shifted rightward. The controller 500 may increase brightness of the LED arrays 411 to 414 or the LEDs emitting light to the first, fifth, and ninth test regions T1, T5, and T9, and decrease brightness of the LED arrays 411 to 414 or the LEDs emitting light to the fourth, eighth and twelfth test regions T4, T8, and T12, and thus, may match the outputs of the LED lighting device 400 with the first reference light distribution region $REF_{R1}$.

To individually control brightness of each of the LED arrays 411 to 414, the controller 500 may change a linear control signal applied to each control terminal of switch elements Q1 to Q4 included in the linear control circuit 422. By way of example, the controller 500 may individually increase or decrease a current flowing in each of the LED arrays 411 to 414 by increasing or decreasing duty ratios of the switch elements Q1 to Q4 included in the linear control circuit 422. When the first LED array 411 emits light to the first, fifth and ninth test regions T1, T5, and T9 and the fourth LED array 413 emits light to the fourth, eighth, and twelfth test regions T4, T8, and T12, the controller 500 may increase the duty ratio of the first switch element Q1 and decrease the duty ratio of the fourth switch element Q4, and may match the outputs of the LED lighting device 400 with the first reference light distribution region $REF_{R1}$.

Figure 11:
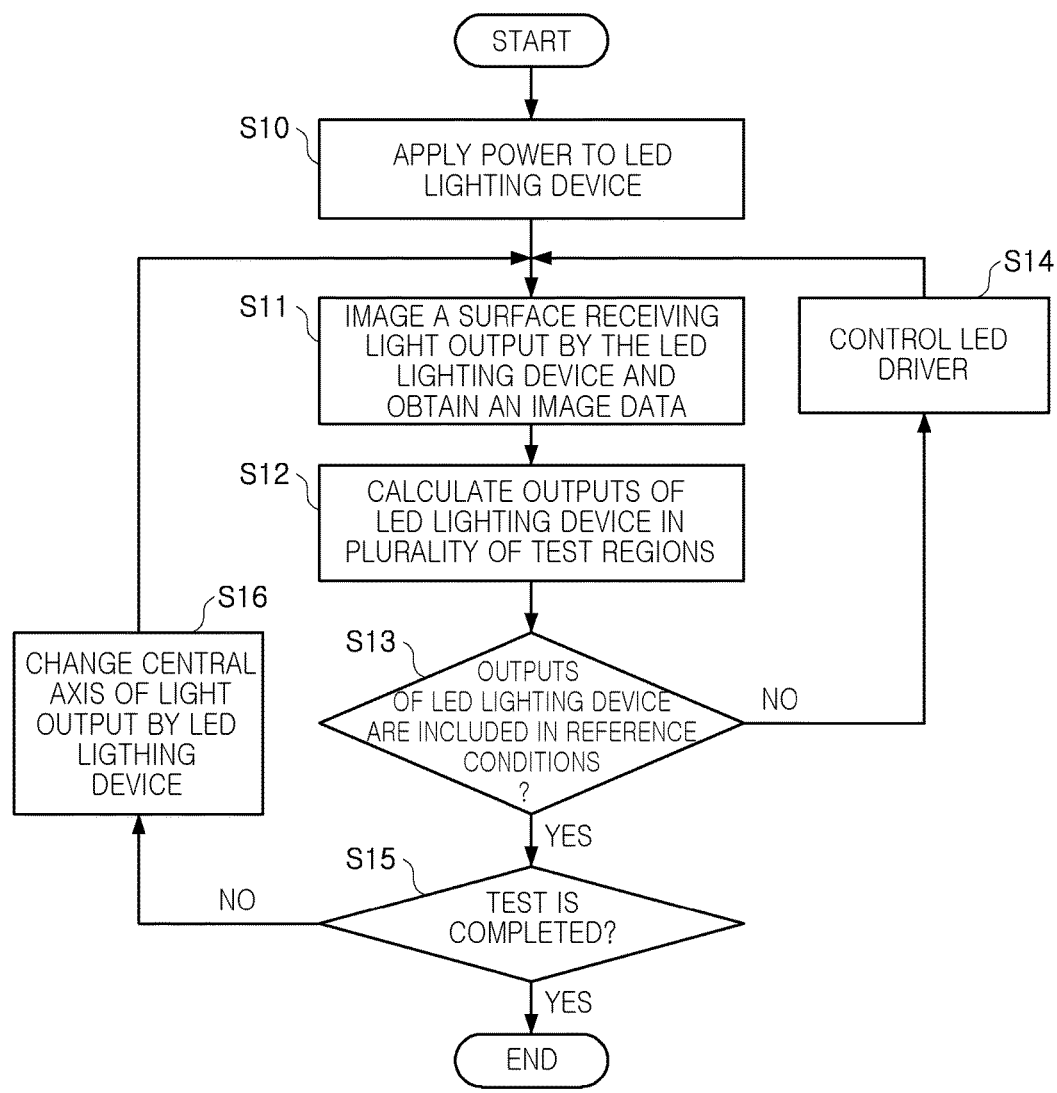
FIG. 11 is a flow chart illustrating a method for testing an LED lighting device according to an example embodiment.

FIG. 11 is a flow chart illustrating a method for testing an LED lighting device according to an example embodiment.

Referring to FIG. 11, the method for testing an LED lighting device according to an example embodiment may begin with applying power to the LED lighting device 24 (S10). The LED lighting device 24 may be mounted on the jig module 22 capable of being tilted in various directions such as upward, downward, left, and right directions, and may receive the applied power through the jig module 22.

The LED lighting device 24 may irradiate light on the light receiving surface due to the power applied in the process S10, and the camera module 21 may image the light receiving surface and obtain image data (S11). The image data may be obtained by imaging light of the LED lighting device 24. The controller 23 may virtually define the plurality of test regions T1 to T12 and may calculate the outputs of the LED lighting device 24 in the respective test regions T1 to T12 based on the image data (S10). The outputs of the LED lighting device 24 calculated in the process S12 may include brightness, a color, or the like, of light irradiated onto the light receiving surface by the LED lighting device 24.

The controller 23 may determine whether the outputs of the LED lighting device 24 calculated in the process S12 are included in predetermined reference conditions (S13). The reference conditions applied to the process S13 may be values determined according to positions of the reference regions R1 to R19 corresponding to the central axis of light output by the LED lighting device 24 and differently defined for the respective test regions T1 to T12. Each reference condition may have a predetermined range defined by a minimum value and a maximum value.

As a result of the determination in the process S13, when it is determined that the outputs of the LED lighting device 24 deviate from the reference conditions, the controller 23 may control operation of the LED driver 26 (S14). As described with reference to FIG. 5 through FIG. 10, the controller 23 may compare the outputs of the LED lighting device 24 calculated in each of the plurality of test regions T1 to T12 with the reference conditions for the respective test regions T1 to T12. When the outputs of the LED lighting device 24 are lower than the minimum values of the reference conditions are detected in one or more of the test regions T1 to T12, the controller 23 may control the operation of the LED driver 26 to increase the outputs of LEDs corresponding to the corresponding test regions T1 to T12. Contrary to this, when the outputs of the LED lighting device 24 higher than the maximum values of the reference conditions are detected in one or more of the test regions T1 to T12, the controller 23 may control the operation of the LED driver 26 to decrease the outputs of LEDs corresponding to the corresponding test regions T1 to T12.

As a result of the determination of the process S13, when it is determined that the outputs of the LED lighting device 24 are included in the reference conditions, the controller 23 may determine whether or not a test process for the LED lighting device 24 has been completed (S15). After the comparison has been performed for each of the reference regions R1 to R19, the outputs of the LED lighting device 24 may be compared with the reference conditions. When a process for controlling the output of the LED driver 26 is performed according to the comparison result, the controller 23 may determine that the test process for the LED lighting device 24 has been completed.

As a result of the determination in the process S15, when it is determined that the test process has not been completed, the controller 23 may move the jig module 22 in such a manner that the central axis of light output by the LED lighting device 24 is changed. That is, in the example embodiments illustrated in FIG. 5 through FIG. 8, the controller 23 may move the jig module 22 a total of 19 times, and at each of the 19 locations, may compare the outputs of the LED lighting device 24 with the reference conditions.

Figure 12:
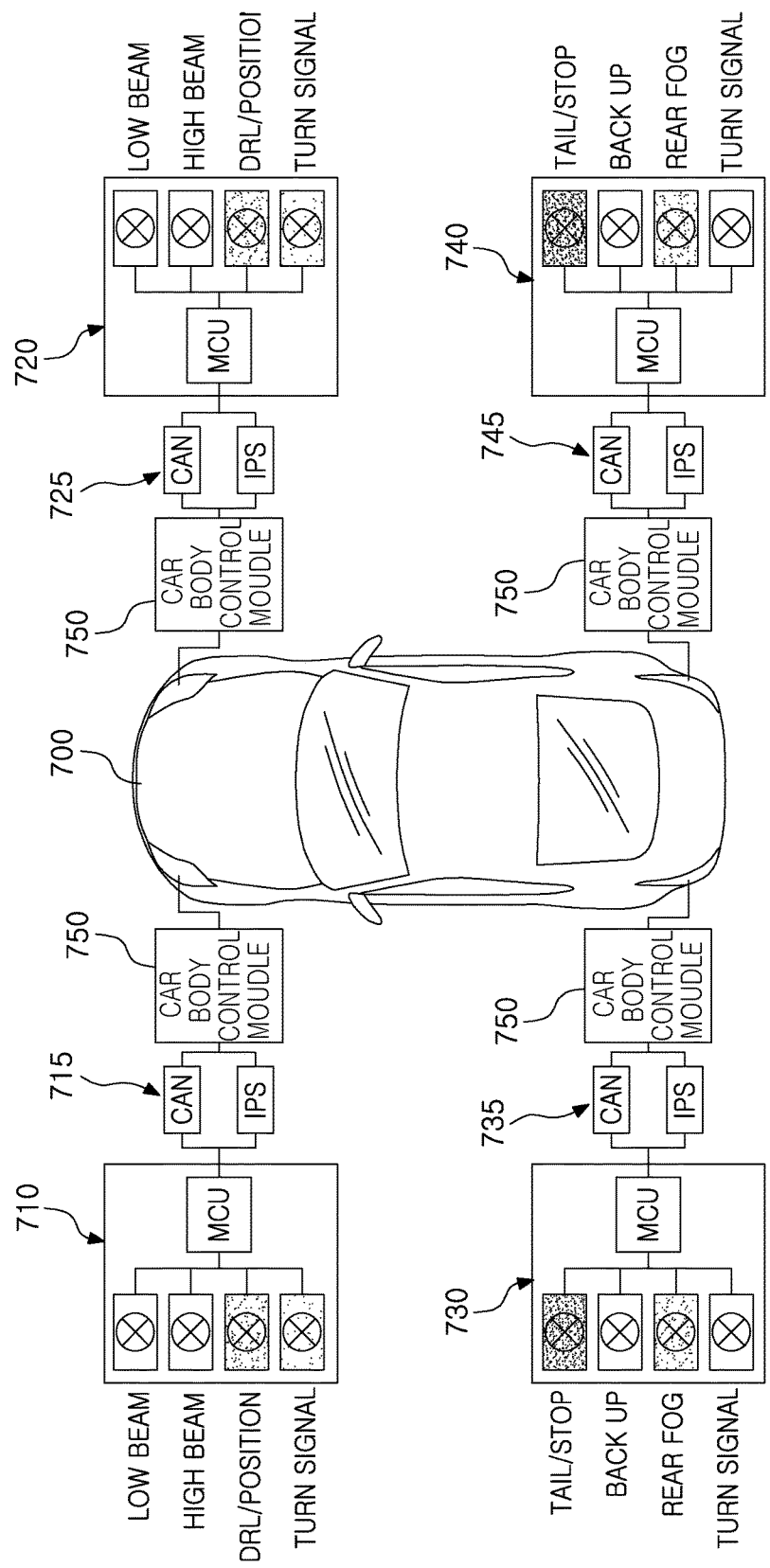
FIG. 12 is a view illustrating a configuration of a motor vehicle employing a motor vehicle lighting device capable of being tested by the device for testing an LED lighting device according to an example embodiment.

FIG. 12 is a view illustrating a configuration of a motor vehicle employing a lighting device for a motor vehicle capable of being tested by the device for testing an LED lighting device according to an example embodiment.

Referring to FIG. 12, LED lighting devices 710 to 740 may be respectively applied to motor vehicle headlamps and tail lamps. The LED lighting devices 710 to 740 may be communicably connected to car body control modules 750 through communication protocols such as CANs or the like. Intelligent power switches (IPSs) may be provided between the LED lighting devices 710 to 740 and the car body control modules 750. The intelligent power switches (IPSs) may be used in detecting the disconnection and short circuits of the LED lighting devices 710 to 740, and an overcurrent and the like in the LED lighting devices 710 to 740.

FIG. 12 illustrates a case in which various microcontrollers (MCUs) that control operations of the LED lighting devices 710 to 740 are respectively provided in left and right headlamps and left and right tail lamps, but this is exemplary, and other configurations may be provided. For example, operations of the left and right headlamps of a motor vehicle 700 may be controlled by a single MCU, and the operations of the left and right tail lamps of the motor vehicle 700 may be controlled by a single LED driving device. In addition, all the left and right headlamps and the left and right tail lamps of the motor vehicle 700 may be controlled by a single LED driving device.

The LED lighting devices 710 to 740 may output light to meet a criteria, such as a criteria defined in an ordinance, and the like. Brightness, an irradiation angle, an optic angle, and the like of the motor vehicle headlamp or tail lamp may be regulated in the ordinance, and the like, and the outputs of the LED lighting devices 710 to 740 may be determined within a range in which the motor vehicle headlamp or tail lamp does not violate the regulation.

The device for testing the LED lighting devices 710 to 740 according to the example embodiment may image light irradiated onto a light receiving surface by the LED lighting devices 710 to 740 to generate image data, and may compare the image data with reference conditions. The outputs of the LED lighting devices 710 to 740 may be changed based on the comparison result, thereby controlling brightness, an irradiation angle, an optic angle, and the like, of the motor vehicle headlamp or tail lamp to meet various criteria, such as those in ordinances. In particular, the outputs of the LED lighting devices 710 to 740 may meet the reference conditions by correcting a value of a current or voltage supplied by the LED driver to LEDs, without the alternation of hardware, such as replacing and redesigning a reflective plate or the LED element itself, thereby reducing time and costs required in a process for testing the LED lighting devices 710 to 740.

Figure 13:
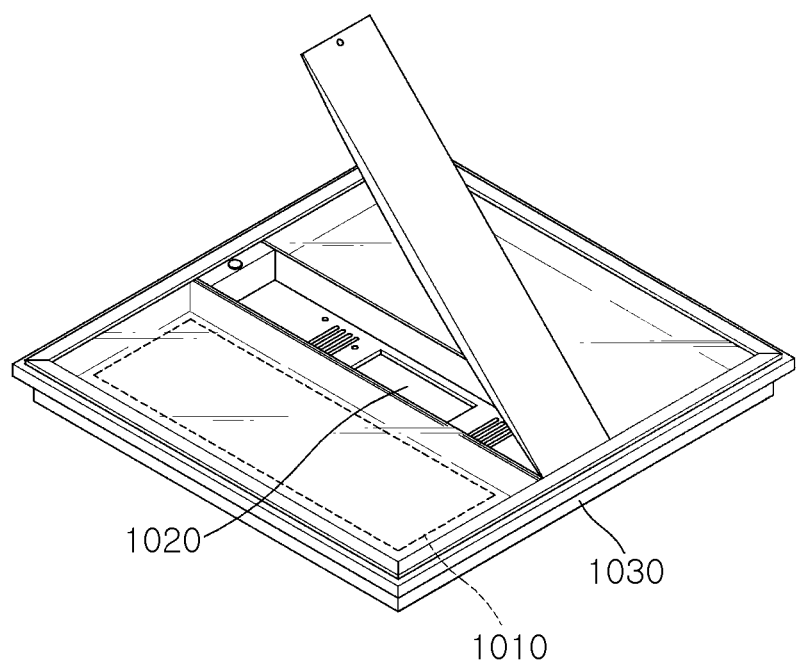
FIG. 13 is a perspective view of a flat lighting device capable of being tested by the device for testing an LED lighting device according to an example embodiment.

FIG. 13 is a perspective view of a flat lighting device capable of being tested by the device for testing an LED lighting device according to an example embodiment.

Referring to FIG. 13, a flat lighting device 1000 may include a light source module 1010, a power supply device 1020, and a housing 1030. According to an example embodiment, the light source module 1010 may include a light emitting device array as a light source, and the power supply device 1020 may include a light emitting device driving unit.

The light source module 1010 may include a light emitting device array and may be formed to have an overall planar shape. The light emitting device array may include a light emitting device and a controller storing driving information of the light emitting device.

The power supply device 1020 may be configured to supply power to the light source module 1010. The housing 1030 may have an accommodation space accommodating the light source module 1010 and the power supply device 1020 therein and have a hexahedral shape with one open side, but the shape of the housing 1030 is not limited thereto. The light source module 1010 may be configured to emit light to the open side of the housing 1030.

An operation of the flat lighting device 1000 according to the example embodiment illustrated in FIG. 13 may be tested by using the device for testing an LED lighting device according to an example embodiment. The testing device may calculate an output of the flat lighting device 1000 from image data obtained by imaging a light receiving surface that light output by the flat lighting device 1000 is incident on, and may compare the image data to a predetermined reference condition. The testing device may control an output of the power supply device 1020 based on the comparison result, and thus, control the flat lighting device 1000 to have desired levels of brightness and an inclination angle.

Figure 14:
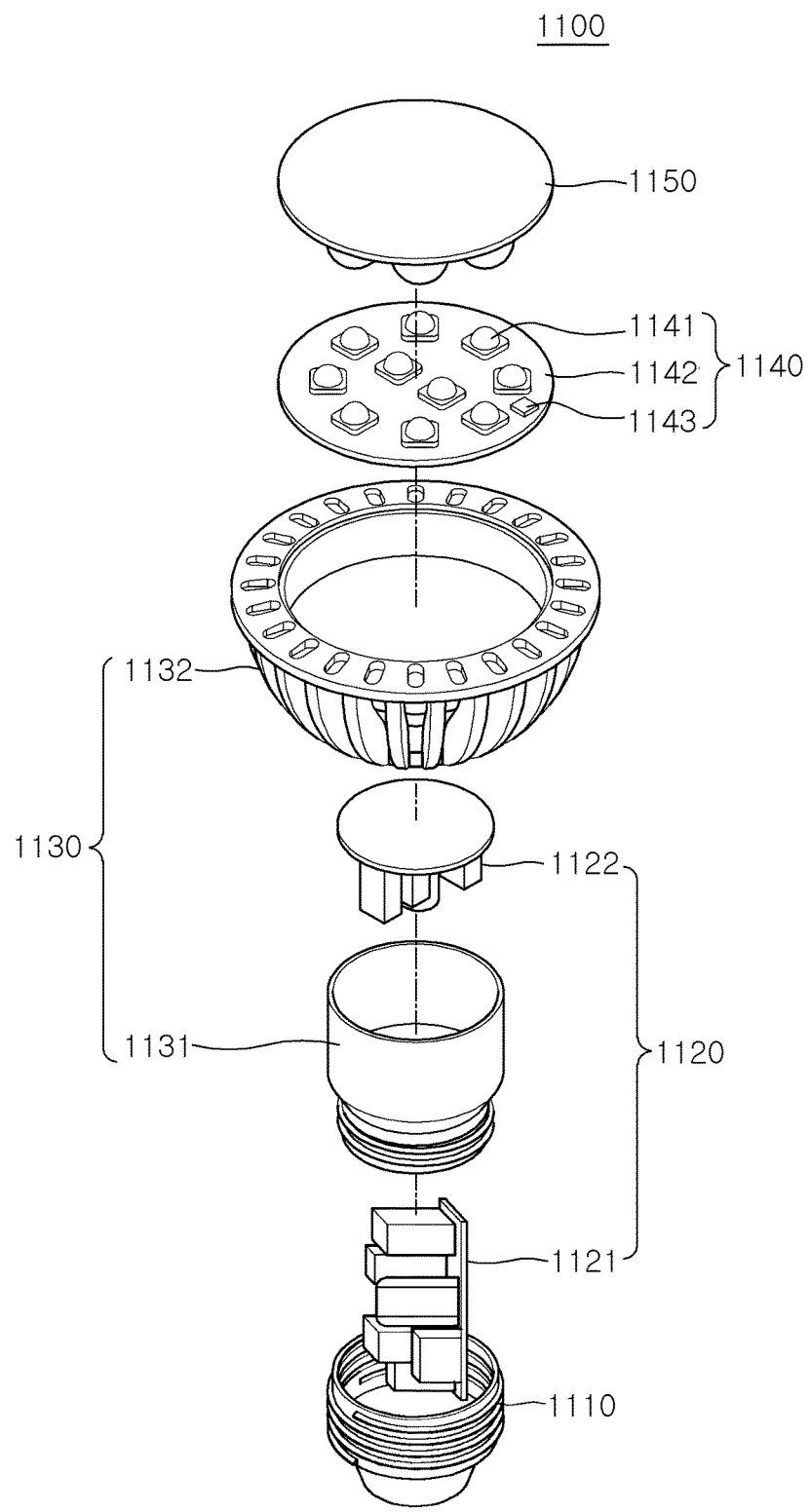
FIG. 14 is an exploded perspective view of a bulb type lamp as a lighting device capable of being tested by the device for testing an LED lighting device according to an example embodiment.

FIG. 14 is an exploded perspective view of a bulb type lamp as a lighting device capable of being tested by the device for testing an LED lighting device according to an example embodiment.

In detail, a lighting device 1100 may include a socket 1110, a power source unit 1120, a heat sink 1130, a light source module 1140, and an optical unit 1150. According to an example embodiment, the light source module 1140 may include a light emitting device array, and the power source unit 1120 may include a light emitting device driving unit.

The socket 1110 may be configured to be replaced with an existing lighting device. Power supplied to the lighting device 1100 may be applied through the socket 1110. As illustrated, the power source unit 1120 may include a first power source unit 1121 and a second power source unit 1122. The first power source unit 1121 and the second power source unit 1122 may be separately provided and assembled to form the power source unit 1120. The heat sink 1130 may include an internal heat sink 1131 and an external heat sink 1132. The internal heat sink 1131 may be directly connected to the light source module 1140 and/or the power source unit 1120 to thereby transmit heat to the external heat sink 1132. The optical unit 1150 may include an internal optical unit and an external optical unit and may be configured to evenly distribute light emitted by the light source module 1140.

The light source module 1140 may emit light to the optical unit 1150 upon receiving power from the power source unit 1120. The light source module 1140 may include one or more light emitting devices 1141, a circuit board 1142, and a controller 1143. The controller 1143 may store driving information of the light emitting devices 1141.

An output of the lighting device 1100 according to the example embodiment illustrated in FIG. 14 may be controlled by using the device for testing an LED lighting device according to and example embodiment. The testing device according to may calculate the output of the lighting device 1100 from image data obtained by imaging a light receiving surface that light output by the lighting device 1100 is incident on, and may compare the image data with a predetermined reference condition. The testing device may control an output of the light source module 1140 based on the comparison result, and thus, may control the lighting device 1100 to have desired levels of brightness and an inclination angle.

Figure 15:
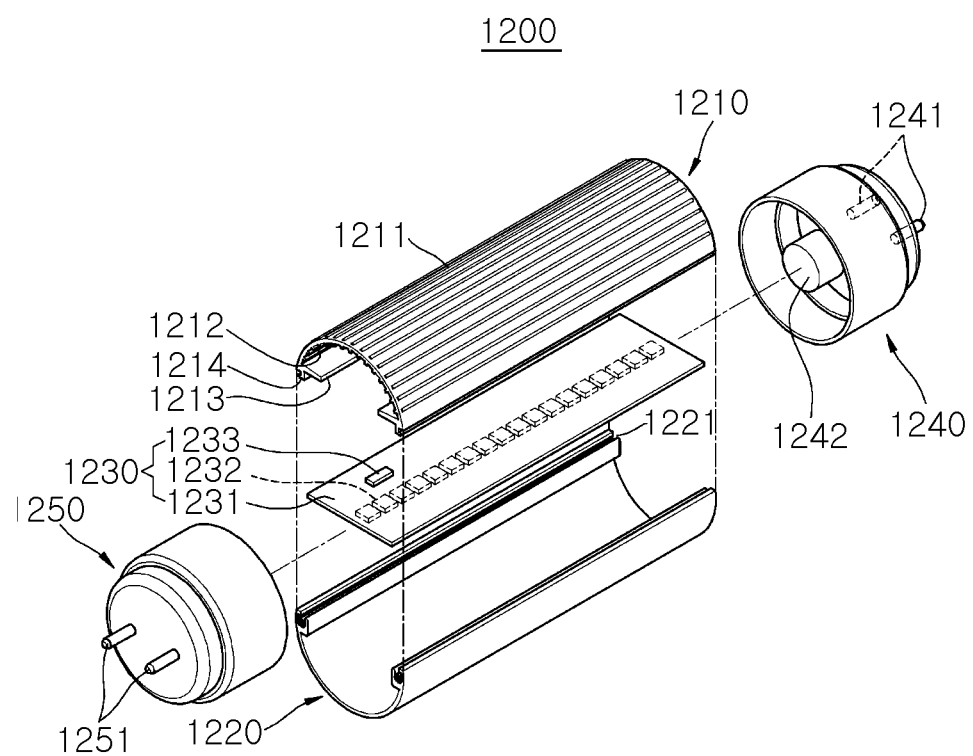
FIG. 15 is an exploded perspective view of a bar type lamp as a lighting device capable of being tested by the device for testing an LED lighting device according to an example embodiment.

FIG. 15 is an exploded perspective view of a bar type lamp as a lighting device capable of being tested by the device for testing an LED lighting device according to an example embodiment.

In detail, a lighting device 1200 includes a heat sink 1210, a cover 1220, a light source module 1230, a first socket 1240, and a second socket 1250. A plurality of heat sink fins 1211 and 1212 may be formed in a concavo-convex pattern on an internal and/or external surface of the heat sink 1210, and the heat sink fins 1211 and 1212 may be designed to have various shapes and intervals (spaces) therebetween. A support portion 1213 having a protruded shape may be formed on an inner side of the heat sink 1210. The light source module 1230 may be fixed to the support portion 1213. Stoppage protrusions 1214 may be formed on both ends of the heat sink 1210.

The stoppage recesses 1221 may be formed in the cover 1220, and the stoppage protrusions 1214 of the heat sink 1210 may be coupled to the stoppage recesses 1221. The positions of the stoppage recesses 1221 and the stoppage protrusions 1214 may be interchanged.

The light source module 1230 may include a light emitting device array. The light source module 1230 may include a PCB 1231, a light source 1232, and a controller 1233. As described above, the controller 1233 may store driving information of the light source 1232. Circuit wirings may be formed on the PCB 1231 to operate the light source 1232. Also, additional components for operating the light source 1232 may be provided.

The first and second sockets 1240 and 1250 are respectively coupled to opposing ends of the cylindrical cover unit including the heat sink 1210 and the cover 1220. For example, the first socket 1240 may include electrode terminals 1241 and a power source device 1242, and dummy terminals 1251 may be disposed on the second socket 1250. Also, an optical sensor and/or a communication module may be installed in either of the first socket 1240 or the second socket 1250. For example, the optical sensor and/or the communication module may be installed in the second socket 1250 in which the dummy terminals 1251 are disposed. In another example, the optical sensor and/or the communication module may be installed in the first socket 1240 in which the electrode terminals 1241 are disposed.

Similar to the example embodiments of FIG. 13 and FIG. 14, an output of the lighting device 1200 according to the example embodiment illustrated in FIG. 15 may be controlled by using the device for testing an LED lighting device according to an example embodiment. The testing device may calculate the output of the lighting device 1200 from image data obtained by imaging a light receiving surface that light output by the lighting device 1200 is incident on, and may compare the image data with a predetermined reference condition. The testing device may control an output of the light source module 1230 based on the comparison result, and thus, may control the lighting device 1200 to have desired levels of brightness and an inclination angle.

Figure 16:
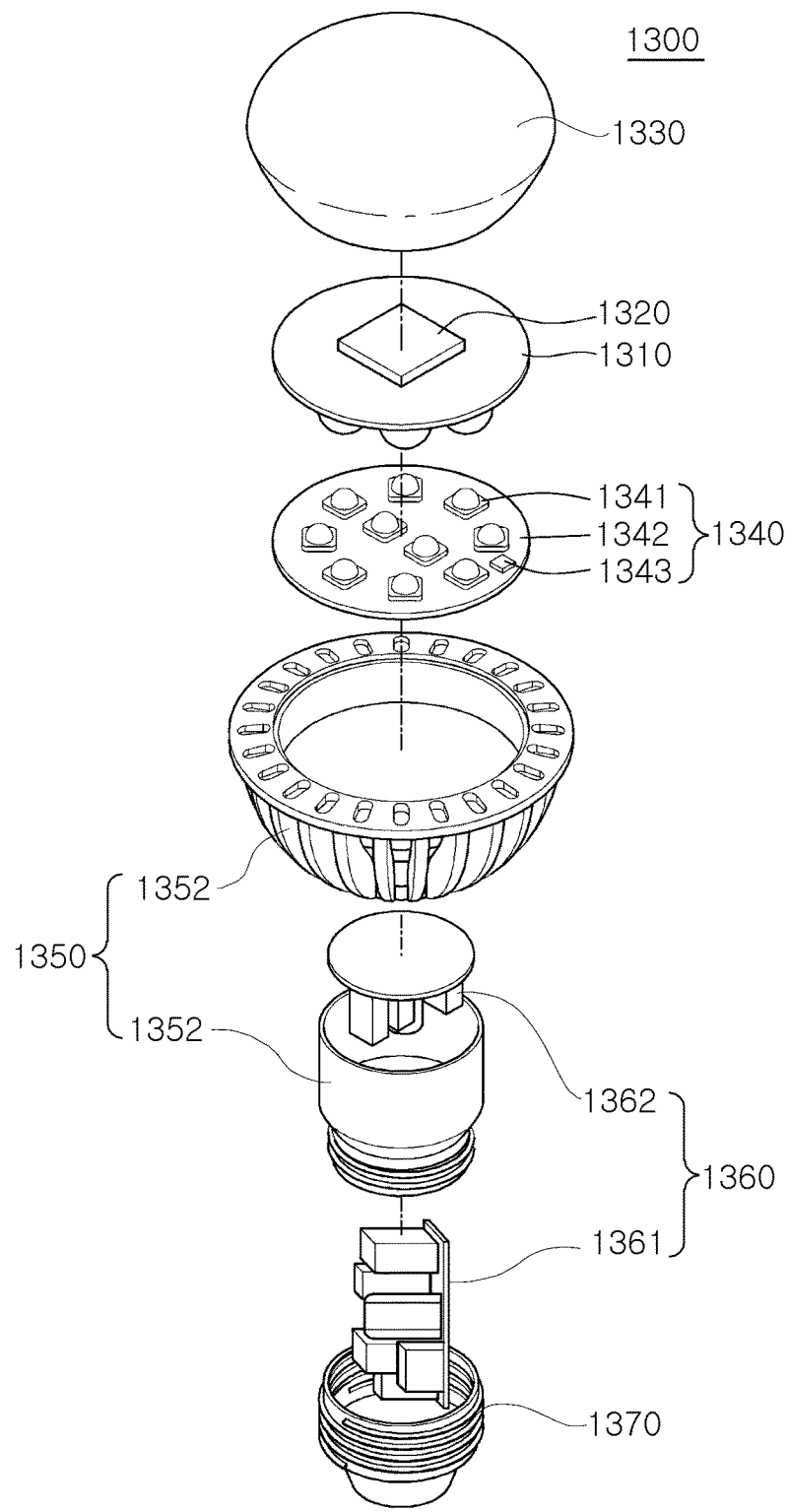
FIG. 16 is an exploded perspective view of a lamp including a communication module as a lighting device capable of being tested by the device for testing an LED lighting device according to an example embodiment.

FIG. 16 is an exploded perspective view of a lamp including a communication module as a lighting device capable of being tested by the device for testing an LED lighting device according to the example embodiment.

In detail, a lighting device 1300 according to an example embodiment is different from the lighting device 1100 illustrated in FIG. 14, in that a reflective plate 1310 is provided above the light source module 1340, and here, the reflective plate 1310 allows light from the light source to spread evenly toward the lateral sides and back side thereof, and thereby glare may be reduced.

A communication module 1320 may be mounted on an upper portion of the reflective plate 1310, and home network communication may be realized through the communication module 1320. For example, the communication module 1320 may be a wireless communication module utilizing ZigBee®, Wi-Fi, or light fidelity (Li-Fi), and may control lighting installed in the interior or on the exterior of a household, such as turning a lighting device on or off, adjusting the brightness of a lighting device, and the like, through a smartphone or a wireless controller. Also, according to various example embodiments, home appliances or an automobile system in the interior or on the exterior of a household, such as a TV, a refrigerator, an air conditioner, a door lock, or automobiles, and the like, may be controlled through a Li-Fi communication module using visible wavelengths of the lighting device installed in the interior or on the exterior of the household.

The reflective plate 1310 and the communication module 1320 may be covered by a cover unit 1330. A socket 1370 may be configured to be replaced with an existing lighting apparatus. Power supplied to the lighting device 1300 may be applied through the socket 1370. As illustrated, a power source unit 1360 may include a first power source unit 1361 and a second power source unit 1362. The first power source unit 1361 and the second power source unit 1362 may be assembled to form the power source unit 1360. A heat sink 1350 may include an internal heat sink 1351 and an external heat sink 1352. The internal heat sink 1351 may be directly connected to the light source module 1340 and/or the power source unit 1360 to transmit heat to the external heat sink 1352. Similar to the example embodiment of FIG. 14, an output of the lighting device 1300 according to the example embodiment illustrated in FIG. 16 may be controlled by using the testing device according to the example embodiment.

Indoor Lighting Control Network System

Figure 17:
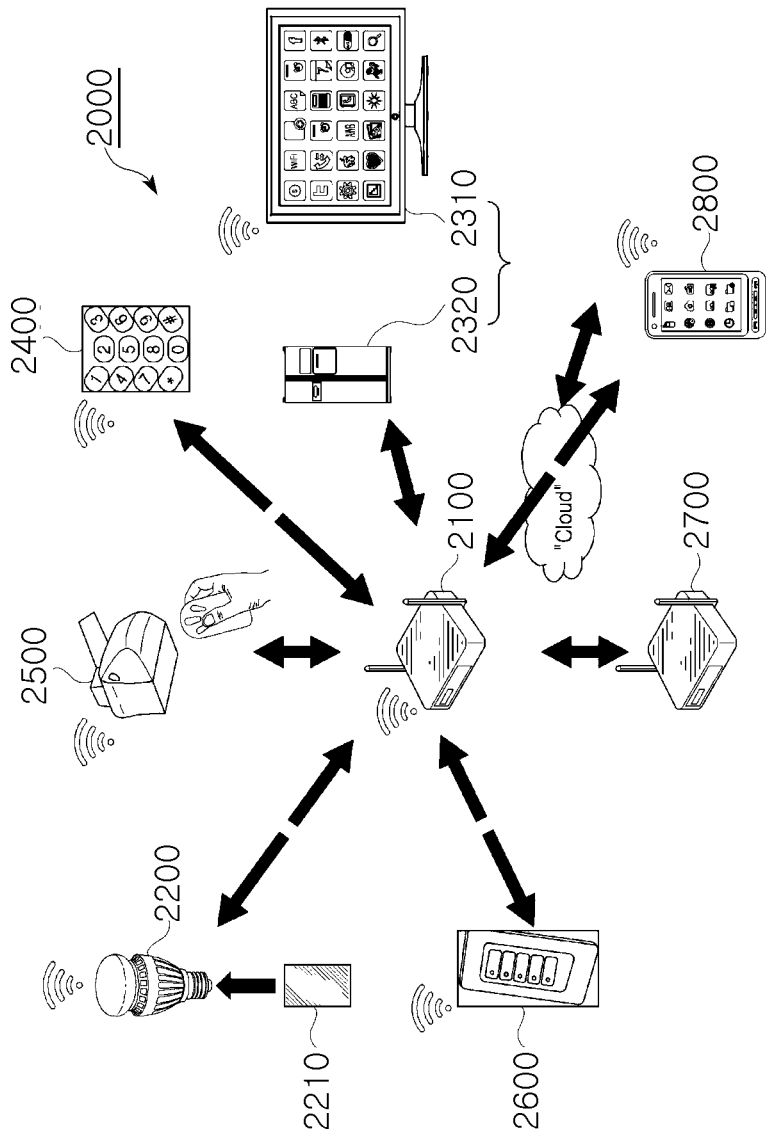
FIG. 17 through FIG. 19 are schematic views, each illustrating a lighting control network system according to various example embodiments.

FIG. 17 is a view schematically illustrating an indoor lighting control network system according to an example embodiment.

A network system 2000 according to an example embodiment may be a complex smart lighting-network system combining lighting technology using a light emitting device such as an LED, or the like, Internet of Things (IoT) technology, wireless communication technology, and the like. The network system 2000 may be realized using various lighting apparatuses and wired/wireless communication devices, and may include a sensor, a controller, a communication unit, software for network control and maintenance, and the like.

The network system 2000 may be implemented in an open space such as a park or a street, as well as in a closed space such as a home or an office. The network system 2000 may be realized on the basis of the IoT environment to collect and process a variety of information and provide the same to users. Here, an LED lamp 2200 included in the network system 2000 may serve not only to receive information regarding a surrounding environment from a gateway 2100 and control lighting of the LED lamp 2200 itself, but also to check and control operational states of other devices 2300 to 2800 included in the IoT environment on the basis of a function such as visible light communication, or the like, of the LED lamp 2200.

Referring to FIG. 17, the network system 2000 may include the gateway 2100 processing data transmitted and received according to different communication protocols, the LED lamp 2200 connected to be available for communicating with the gateway 2100 and including an LED light emitting device, and a plurality of devices 2300 to 2800 connected to be available for communicating with the gateway 2100 according to various wireless communication schemes. To realize the network system 2000 on the basis of the IoT environment, each of the devices 2300 to 2800, as well as the LED lamp 2200, may include at least one communication module. In an example embodiment, the LED lamp 2200 may be connected to be available for communicating with the gateway 2100 according to wireless communication protocols such as Wi-Fi, ZigBee®, or Li-Fi, and to this end, the LED lamp 2200 may include at least one communication module 2210 for a lamp.

As mentioned above, the network system 2000 may be implemented in an open space such as a park or a street, as well as in a closed space such as a home or an office. When the network system 2000 is implemented in a home, the plurality of devices 2300 to 2800 included in the network system and connected to be available for communicating with the gateway 2100 on the basis of IoT technology may include, for example, a home appliance 2300, a digital door lock 2400, a garage door lock 2500, a light switch 2600 installed on a wall, or the like, a router 2700 for relaying a wireless communication network, and a mobile device 2800 such as a smartphone, a tablet PC, or a laptop computer.

In the network system 2000, the LED lamp 2200 may check operational states of various devices 2300 to 2800 using the wireless communication network (ZigBee®, Wi-Fi, LI-Fi, etc.) installed in a household or may automatically control illumination of the LED lamp 2200 itself according to a surrounding environment or situation. Also, the devices 2300 to 2800 included in the network system 2000 may be controlled using Li-Fi communication using visible light emitted from the LED lamp 2200.

First, the LED lamp 2200 may automatically adjust illumination of the LED lamp 2200 on the basis of information of a surrounding environment transmitted from the gateway 2100 through the communication module 2210 for a lamp or information of a surrounding environment collected from a sensor installed in the LED lamp 2200. For example, brightness of illumination of the LED lamp 2200 may be automatically adjusted according to types of programs broadcast on the TV 2310 or brightness of a screen. To this end, the LED lamp 2200 may receive operation information of the TV 2310 from the communication module 2210 for a lamp connected to the gateway 2100. The communication module 2210 for a lamp may be integrally modularized with a sensor and/or a controller included in the LED lamp 2200.

For example, when a TV program broadcast is a drama, a color temperature of illumination may be reduced to 12,000 K or lower, for example, to 5,000 K, and a color tone may be adjusted according to preset values, to provide a cozy atmosphere. Conversely, when a program broadcast is a comedy, the network system 2000 may be configured so that a color temperature of illumination is increased to 5,000 K or higher according to a preset value, and illumination is adjusted to blue-based white light.

Also, in a situation in which no one is in a home, and a predetermined time has lapsed after the digital door lock 2400 is locked, all of the turned-on LED lamps 2200 are turned off to prevent a waste of electricity. Also, when a security mode is set through the mobile device 2800, or the like, and the digital door lock 2400 is locked when no one is in a home, the LED lamp 2200 may be maintained in a turned-on state.

An operation of the LED lamp 2200 may be controlled according to surrounding environments collected through various sensors connected to the network system 2000. For example, when the network system 2000 is realized in a building, a lighting, a position sensor, and a communication module are combined in the building, and position information of people in the building is collected and the lighting is turned on or turned off, or the collected information may be provided in real time to effectively manage facilities or effectively utilize an idle space. In general, a lighting apparatus, such as the LED lamp 2200, may be disposed in almost every space of each floor of a building, and thus, various types of information of the building may be collected through a sensor integrally provided with the LED lamp 2200 and used for managing facilities and utilizing an idle space.

The LED lamp 2200 may be combined with an image sensor, a storage device, and the communication module 2210 for a lamp, to be utilized as a device for maintaining building security, or sensing and coping with an emergency situation. For example, when a smoke or temperature sensor, or the like, is attached to the LED lamp 2200, a fire may be promptly sensed to minimize damage. Also, brightness of lighting may be adjusted in consideration of outside weather or an amount of sun light, thereby saving energy and providing an agreeable illumination environment.

An output of the LED lighting device 2200 may be controlled by using the testing devices according to various example embodiments. The testing device according to example embodiments may compare the output of the LED lighting device 2200 to a predetermined reference condition and may change an output of an LED driver included in the LED lighting device 2200 according to the comparison result. Thus, the output of the LED lighting device 2200 may be controlled to have desired levels of brightness and an inclination angle without an alteration of hardware, and accordingly, a cost and time required in a testing process may be reduced.

As described above, the network system 2000 may also be applied to an open space such as a street or a park, as well as to a closed space such as a home, an office, or a building. When the network system 2000 is intended to be applied to an open space without a physical limitation, it may be difficult to realize the network system 2000 due to a limitation in a distance of wireless communication or communication interference due to various obstacles. In this case, a sensor, a communication module, and the like, may be installed in each lighting fixture, and each lighting fixture may be used as an information collector or a communication relay, whereby the network system 2000 may be more effectively realized in an open environment. This will hereinafter be described with reference to FIG. 18.

Figure 18:
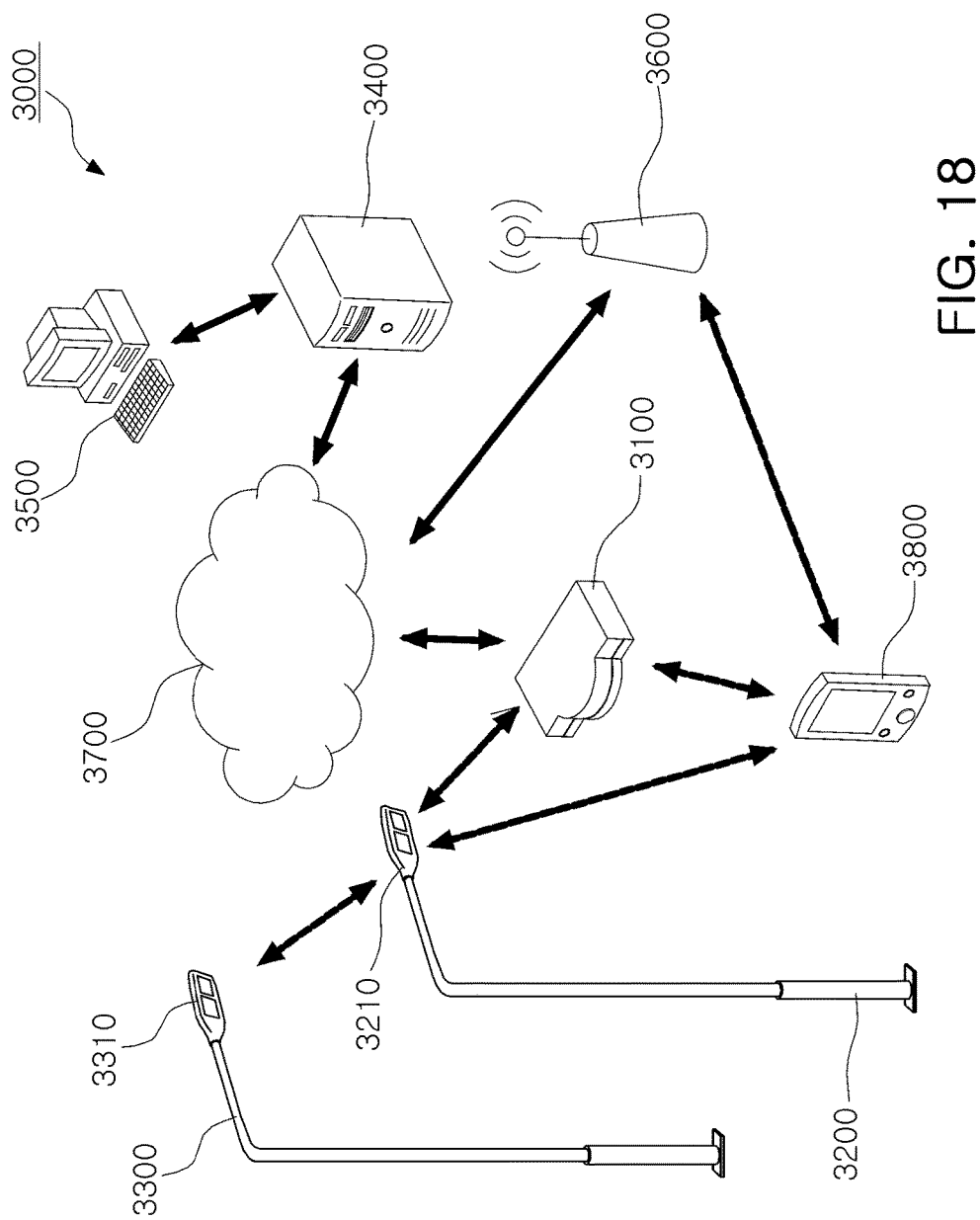

FIG. 18 is a view illustrating an example embodiment of a network system 3000 applied to an open space. Referring to FIG. 18, a network system 3000 according to the present example embodiment may include a communication connection device 3100, a plurality of lighting fixtures 3200 and 3300 installed at predetermined intervals and connected to be available for communicating with the communication connection device 3100, a server 3400, a computer 3500 managing the server 3400, a communication base station 3600, a communication network 3700, a mobile device 3800, and the like.

Each of the plurality of lighting fixtures 3200 and 3300 installed in an open outer space such as a street or a park may include smart engines 3210 and 3310, respectively. The smart engines 3210 and 3310 may include a light emitting device, a driver of the light emitting device, a sensor collecting information of a surrounding environment, a communication module, and the like. The smart engines 3210 and 3310 may communicate with other neighboring equipment according to communication protocols such as Wi-Fi, ZigBee®, and Li-Fi.

For example, one smart engine 3210 may be connected to communicate with another smart engine 3310. Here, a Wi-Fi extending technique (Wi-Fi mesh) may be applied to communication between the smart engines 3210 and 3310. The at least one smart engine 3210 may be connected to the communication connection device 3100 connected to the communication network 3700 by wired/wireless communication. To increase communication efficiency, some smart engines 3210 and 3310 may be grouped and connected to the single communication connection device 3100.

The communication connection device 3100 may be an access point (AP) available for wired/wireless communication, which may relay communication between the communication network 3700 and other equipment. The communication connection device 3100 may be connected to the communication network 3700 in either a wired manner or a wireless manner, and for example, the communication connection device 3100 may be mechanically received in any one of the lighting fixtures 3200 and 3300.

The communication connection device 3100 may be connected to the mobile device 3800 through a communication protocol such as Wi-Fi, or the like. A user of the mobile device 3800 may receive surrounding environment information collected by the plurality of smart engines 3210 and 3310 through the communication connection device 3100 connected to the smart engine 3210 of the lighting fixture 3200 adjacent to the mobile device 3800. The surrounding environment information may include nearby traffic information, weather information, and the like. The mobile device 3800 may be connected to the communication network 3700 according to a wireless telecommunications scheme such as 3G or 4G through the communication base station 3600.

The server 3400 connected to the communication network 3700 may receive information collected by the smart engines 3210 and 3310 respectively installed in the lighting fixtures 3200 and 3300, and monitor an operational state or the like, of each of the lighting fixtures 3200 and 3300. To manage the lighting fixtures 3200 and 3300 on the basis of the monitoring results of the operational states of the lighting fixtures 3200 and 3300, the server 3400 may be connected to the computer 3500 providing a management system. The computer 3500 may execute software, or the like, capable of monitoring and managing operational states of the lighting fixtures 3200 and 3300, specifically, the smart engines 3210 and 3310.

Figure 19:
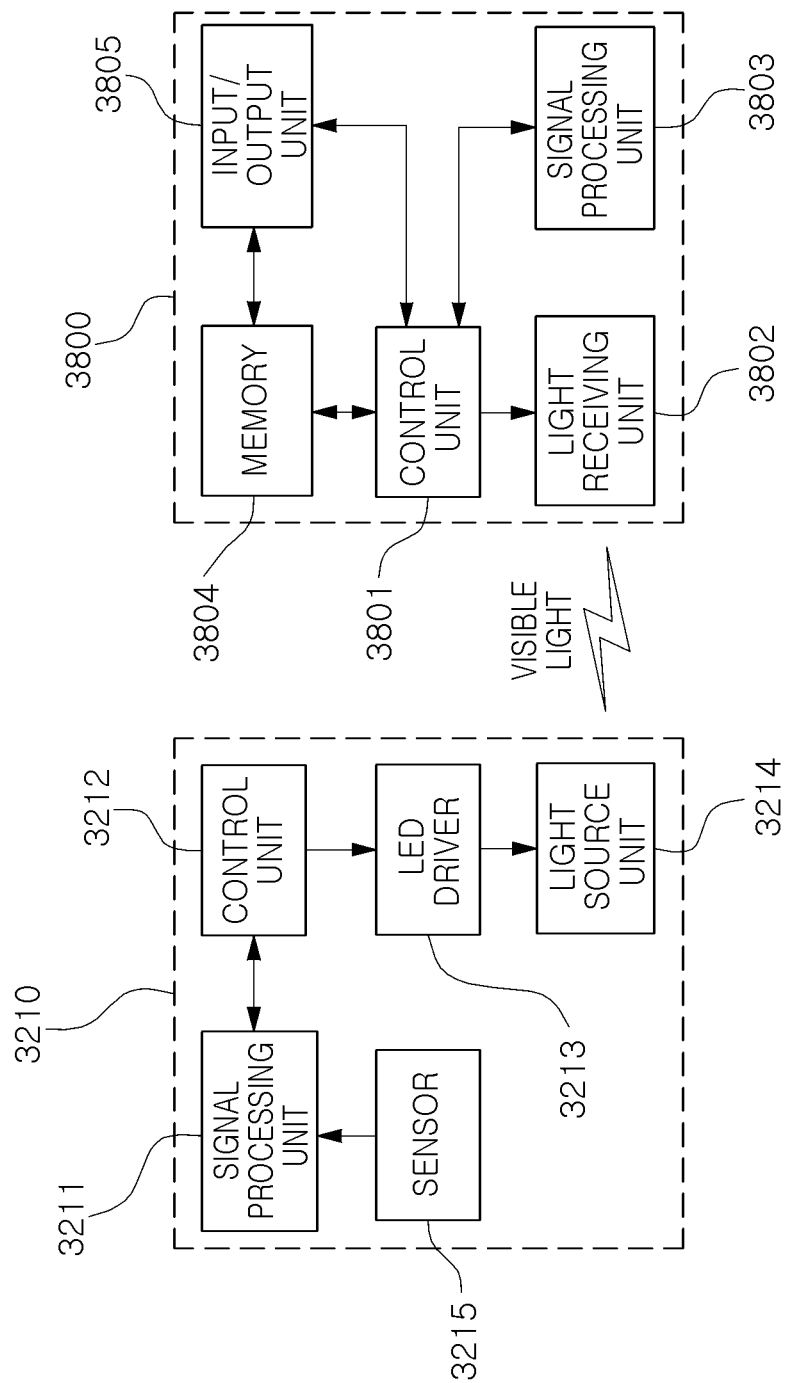

To transmit information collected by the smart engines 3210 and 3310 to the mobile device 3800 of the user, various communication schemes may be applied. Referring to FIG. 19, information collected by the smart engines 3210 and 3310 may be transmitted to the mobile device 3100 through the communication connection device 3100 connected to the smart engines 3210 and 3310, or the smart engines 3210 and 3310 and the mobile device 3800 may be connected to directly communicate with each other. The smart engines 3210 and 3310 and the mobile device 3800 may directly communicate with each other by visible light communication (Li-Fi). This will hereinafter be described with reference to FIG. 19.

FIG. 19 is a block diagram illustrating a communication operation between the smart engine 3210 of the lighting fixture 3200 and the mobile device 3800 according to visible light communication. Referring to FIG. 19, the smart engine 3210 may include a signal processing unit 3211, a control unit 3212, an LED driver 3213, a light source unit 3214, a sensor 3215, and the like. The mobile device 3800 connected to the smart engine 3210 by visible light communication may include a control unit 3801, a light receiving unit 3802, a signal processing unit 3803, a memory 3804, an input/output unit 3805, and the like.

The visible light communication (VLC) technology (or light fidelity (Li-Fi)) is a wireless communication technology communicating wirelessly by using light having a visible light wavelength band recognizable to the naked eye. The visible light communication technology is distinguished from the existing wired optical communication technology and the infrared data association (IrDA) in that it uses light having a visible light wavelength band, namely, a visible light frequency from the light emitting device package according to the example embodiment described above, and is distinguished from the existing wired optical communication technology in that a communication environment is based on a wireless scheme. Also, unlike RF wireless communication, the VLC technology (or Li-Fi) has excellent convenience because it can be used without being regulated or authorized in the aspect of frequency usage, and VLC technology (or Li-Fi) has a distinction of having excellent physical security and a user's verification of a communication link with his or her own eyes. Most of all, VLC technology (or Li-Fi) is differentiated in that it has features as a convergence technology that obtains both a unique purpose as a light source and a communication function.

Referring to FIG. 19, the signal processing unit 3211 of the smart engine 3210 may process data intended to be transmitted and received by VLC. In an example embodiment, the signal processing unit 3211 may process information collected by the sensor 3215 into data and transmit the processed data to the control unit 3212. The control unit 3212 may control operations of the signal processing unit 3211, the LED driver 3213, and the like, and in particular, the control unit 3212 may control an operation of the LED driver 3213 on the basis of data transmitted from the signal processing unit 3211. The LED driver 3213 drives the light source unit 3214 to emit light according to a control signal transmitted from the control unit 3212, thereby transmitting data to the mobile device 3800.

The mobile device 3800 may include the light receiving unit 3802 for recognizing visible light including data, in addition to the control unit 3801, the memory 3804 storing data, the input/output unit 3805 including a display, a touchscreen, an audio output unit, and the like, and the signal processing unit 3803. The light receiving unit 3802 may sense visible light and convert the sensed visible light into an electrical signal, and the signal processing unit 3803 may decode data included in the electrical signal converted by the light receiving unit 3802. The control unit 3801 may store the data decoded by the signal processing unit 3803 in the memory 3804 or may output the decoded data through the input/output unit 3805 to allow the user to recognize the data.

In the example embodiments of FIG. 18 and FIG. 19, the respective smart engines 3210 and 3310 may output light in accordance with predetermined conditions for visible light communication (VLC). Brightness, an irradiation angle, a color and the like, of light output by the smart engines 3210 and 3310 according to the example embodiments of FIG. 18 and FIG. 19 may be tested by the testing devices according to various example embodiments. The testing device according to the example embodiment may compare the brightness, color and the like of light output by the smart engines 3210 and 3310 with a predetermined reference condition, and may control an output of the LED driver 3213 based on the comparison result. Thus, even when the smart engines 3210 and 3310 output light deviating from the predetermined reference condition, the outputs of the smart engines 3210 and 3310 may be controlled to have desired values without an alternation of hardware, and accordingly, a cost and time may be saved.

As set forth above, according to various example embodiments, whether an output of an LED lighting device meets a reference condition may be tested by changing a central axis of light emitted by the LED lighting device. In addition, when the output of the LED lighting device does not satisfy the reference condition, an operation of a driver included in the LED lighting device may be changed in such a manner that the output of the LED lighting device is controlled to satisfy the reference condition. Therefore, even in case in which the output of the LED lighting device does not initially satisfy the reference condition, the LED lighting device may be controlled to meet the reference condition without the alternation of hardware, thereby allowing for a reduction in a cost and time.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems Sc) that the computer readable code is stored and executed in a distributed fashion.

At least one of the components, elements, modules or units (e.g., camera module, jig module, car body control module, communication module) may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules units represented by a block or processing steps may employ any number of related art techniques for electronics configuration, signal processing and/or control, data processing and the like.

While example embodiments have been shown and described above, it will be apparent to those skilled in the art that modifications and variations could be made without departing from the scope of the inventive concept as defined by the following claims.

What is claimed is:

1. A device for testing a light emitting diode (LED) lighting device comprising a plurality of LEDs and an LED driver configured to drive the plurality of LEDs to emit light, the device comprising:
   a camera configured to image a surface on which light output by the LED lighting device is incident, and generate image data corresponding to an output of the LED lighting device; and
   a controller configured to compare the image data with a reference condition, and in response to the output of the LED lighting device deviating from the reference condition, control the LED driver to modify brightness of at least a portion of the plurality of LEDs.

2. The device of claim 1, wherein the controller is further configured to virtually partition the surface into a plurality of test regions and compare the output of the LED lighting device calculated in each of the plurality of test regions with the reference condition.

3. The device of claim 2, wherein the reference condition comprises a plurality of reference conditions corresponding to each of the plurality of test regions.

4. The device of claim 2, wherein the portion of the plurality of LEDs correspond to at least one test region of the plurality of test regions in which the output of the LED lighting device is determined to deviate from the reference condition.

5. The device of claim 1, further comprising a jig on which the LED lighting device is mounted,
   wherein the controller is further configured to control the jig to move the LED lighting device to change an incident angle of light output by the plurality of LEDs, with respect to the surface.

6. The device of claim 5, wherein the controller is further configured to reset the reference condition based on a changed incident angle.

7. The device of claim 5, wherein the reference condition comprises a plurality of reference regions within the surface and the controller is further configured to sequentially control the jig to move the LED lighting device such that a central axis of the light output by the LED lighting device corresponds to each of the plurality of reference regions.

8. The device of claim 7, wherein the reference condition comprises a plurality of reference conditions corresponding to the plurality of reference regions.

9. The device of claim 1, wherein the reference condition comprises a minimum value and a maximum value of brightness of the light output by the LED lighting device,
   wherein the controller is further configured to increase an output current of the LED driver in response to the output of the LED lighting device being less than the minimum value, and decrease the output current of the LED driver when the output of the LED lighting device is higher than the maximum value.

10. A device for testing a light emitting diode (LED) lighting device, comprising:
    a jig on which the LED lighting device is mounted;
    a camera configured to image a surface on which light output by the LED lighting device is incident, and generate image data corresponding to an output of the LED lighting device; and
    a controller configured to control the jig to move the jig to control an incident angle of the light output by the LED lighting device, compare the image data with a reference condition corresponding to the incident angle, and control the LED lighting device based on the comparison.

11. The device of claim 10, wherein the controller is further configured to compare a first reference condition corresponding to a first incident angle, and a second reference condition corresponding to a second incident angle.

12. The device of claim 10, wherein the controller is further configured to virtually partition the surface into a plurality of test regions and compare the image data corresponding to each of the plurality of test regions with a different reference condition for each of the plurality of test regions.

13. The device of claim 10, wherein the controller is further configured to define a plurality of reference regions on the surface and control an incident angle of light output by the plurality of LEDs by controlling the light output by the LED lighting device corresponding to one of the plurality of reference regions.

14. The device of claim 10, wherein the controller is further configured to control the jig to tilt to control the incident angle of the light output by the LED lighting device.

15. The device of claim 10, wherein the LED lighting device comprises at least one among a motor vehicle headlamp and a motor vehicle tail lamp.

16. The device of claim 10, wherein the controller is further configured to compare the reference condition with the image data and determine at least one LED of the LED lighting device to be controlled based on the comparison.

17. A device for testing a light emitting device including a first light emitting diode (LED), a second LED and a light controller configured to drive the first LED and the second LED, the device comprising:

a jig which supports the light emitting device and is configured to move the light emitting device to a first position corresponding to a first incident angle of light and a second position corresponding to a second incident angle of light;

a camera configured to generate image data indicating brightness of a first area and a second area of a surface; and a controller configured to control the jig to move the light emitting device to the first position, compare the image data with a first reference condition, generate first comparison data, control the jig to move the light emitting device to the second position, compare the image data with a second reference condition, generate second comparison data and generate compensation data based on the first comparison data and the second comparison data.

18. The device of claim 17, wherein the light controller controls the first light emitting diode and the second light emitting diode based on the compensation data.

19. The device of claim 18, wherein the first reference condition comprises information corresponding to the first position and the second reference condition comprises information corresponding to the first position and the second position.

20. The device of claim 19, wherein the compensation data controls the light emitting device to selectively control a first current supplied to the first LED and a second current supplied to the second LED.

* * * * *